US008095882B2

(12) United States Patent
Kashi

(10) Patent No.: US 8,095,882 B2
(45) Date of Patent: Jan. 10, 2012

(54) ADDITIONAL FUNCTIONALITY FOR TELEPHONE NUMBERS AND UTILIZATION OF CONTEXT INFORMATION ASSOCIATED WITH TELEPHONE NUMBERS IN COMPUTER DOCUMENTS

(75) Inventor: Ramanujan Kashi, Pune (IN)

(73) Assignee: Avaya Technology Corp., Basking Ridge, NJ (US)

( * ) Notice: Subject to any disclaimer, the term of this patent is extended or adjusted under 35 U.S.C. 154(b) by 1449 days.

(21) Appl. No.: 11/238,280

(22) Filed: Sep. 29, 2005

(65) Prior Publication Data

US 2006/0034434 A1 Feb. 16, 2006

Related U.S. Application Data

(63) Continuation-in-part of application No. 10/697,468, filed on Oct. 30, 2003, now abandoned, and a continuation-in-part of application No. 11/191,700, filed on Jul. 28, 2005, now abandoned, and a continuation-in-part of application No. 11/224,160, filed on Sep. 12, 2005.

(51) Int. Cl.
*G06F 17/00* (2006.01)
(52) U.S. Cl. ........ 715/763; 715/753; 715/781; 715/804; 455/418; 455/563; 379/93.07
(58) Field of Classification Search .......... 715/234–237, 715/760–764, 259–273
See application file for complete search history.

(56) References Cited

U.S. PATENT DOCUMENTS

| 5,774,664 | A | 6/1998 | Hidary et al. | |
|---|---|---|---|---|
| 5,778,181 | A | 7/1998 | Hidary et al. | |
| 5,946,647 | A | 8/1999 | Miller et al. | |
| 5,960,411 | A | 9/1999 | Hartman et al. | |
| 6,018,768 | A | 1/2000 | Ullman et al. | |
| 6,317,781 | B1 | 11/2001 | De Boor et al. | |
| 6,501,779 | B1 | 12/2002 | McLaughlin et al. | |
| 6,870,828 | B1 * | 3/2005 | Giordano, III | 370/352 |
| 2002/0009071 | A1 | 1/2002 | Yaary et al. | |
| 2003/0091166 | A1 * | 5/2003 | Hershenson | 379/88.17 |
| 2003/0152207 | A1 | 8/2003 | Ryan | |
| 2007/0121909 | A1 * | 5/2007 | Schnurr | 379/355.01 |
| 2008/0297855 | A1 * | 12/2008 | Silverbrook et al. | 358/473 |

OTHER PUBLICATIONS

Bill Coan, A Developer's Take on Smart Tags, Microsoft Developer Network [online], Feb. 20, 2005 [retrieved on Jul. 20, 2005]. Retrieved from the Internet: <URL: http://msdn.microsoft.com/-library/default.asp?url=/library/en-us/dno2k3ta/html/officedeveloperstakeonsmarttags.asp>.

(Continued)

*Primary Examiner* — Quoc A Tran
(74) *Attorney, Agent, or Firm* — Cozen O'Connor

(57) ABSTRACT

Telephone numbers are identified and highlighted on any computer document being loaded into a graphical user interface (GUI) for viewing by a user, and context information associated with the telephone numbers so tagged may also be viewed. The user may click on any particular highlighted telephone number or context information in the computer document while displayed in the GUI window in order to store the telephone number together with any desired context information associated therewith, or perform other functions, such as sending a facsimile transmission to the number, sending a message (e.g., SMS, IM or e-mail) or searching an associated database for prior occurrences of the telephone number or context information.

46 Claims, 10 Drawing Sheets

OTHER PUBLICATIONS

Paul Cornell, Developing Simple Smart Tags, Microsoft Developer Network [online], May 2001[retrieved on Jul. 20, 2005]. Retrieved from the Internet: <URL: http://msdn.microsoft.com/-library/default.asp?url=/library/en-us/dnsmarttag/html/odc_smarttags.asp>.

J. Sawyer, Building Smart Tags in Microsoft Visual Basic .NET, Microsoft Developer Network [online], Oct. 2001[retrieved on Jul. 20, 2005]. Retrieved from the Internet: <URL: http://msdn.microsoft.com/library/default.asp?url=/library/en-us/dnsmarttag/html/odc_stvbnet.asp>.

Paul Cornell, Developing Smart Tag DLLs, Microsoft Developer Network [online], Apr. 2001[retrieved on Jul. 20, 2005]. Retrieved from the Internet: <URL: http://msdn.microsoft.com/-library/default.asp?url=/library/en-us/dnsmarttag/html/odc_smarttags.asp >.

Markus Eggers, Regular Expression Support in Microsoft Office System Smart Tags, Microsoft Developer Network [online], Aug. 2003[retrieved on Jul. 20, 2005]. Retrieved from the Internet: <URL: http://msdn.microsoft.com/library/default.asp?url=/library/en-us/dno2k3ta/html/odc_regex_smarttags_2003.asp>.

* cited by examiner

FIG. 2A

ADDITIONAL FUNCTIONALITY FOR TELEPHONE NUMBERS AND UTILIZATION OF CONTEXT INFORMATION ASSOCIATED WITH TELEPHONE NUMBERS IN COMPUTER DOCUMENTS

CROSS REFERENCE TO RELATED APPLICATION

This application is a continuation-in-part of U.S. patent application Ser. No. 10/697,468 which was filed with the U.S. Patent and Trademark Office on Oct. 30, 2003, now abandoned Ser. No. 11/191,700, which was filed with the U.S. Patent and Trademark Office on Jul. 28, 2005 now abandoned and Ser. No. 11/224,160, which was filed with the U.S. Patent and Trademark Office on Sep. 12, 2005, and which are each hereby incorporated by reference in their entireties.

BACKGROUND OF THE INVENTION

1. Field of the Invention

The present disclosure relates generally to computer documents and, specifically, to providing users with additional functionality for telephone numbers and context information surrounding telephone numbers found in computer documents.

2. Description of the Related Art

Although computers (i.e., devices that compute) date back to the abacus in Ancient China and Babylonia, it has only been in the last century that the term "computer" has developed its modern definition as a machine that accepts data and manipulates it to produce a result based on a program (sequence of instructions). In recent years, as technological growth and innovations rapidly bring new devices and appliances to the world, the technology of computing has become more and more vitally connected to the world's economy and people's daily life, as seen in the evolving form and mutations of the computer: from PDAs, notebooks, personal computers, minicomputers, LAN/Internet servers, and mainframes to cell phones and embedded processors in household appliances, car components, pets, furniture, etc. Today's computer can be any electronic, magnetic, optical, or software device for processing data, and such data processing can take the form of logical, arithmetic, memory, and/or storage functions.

As the computer has evolved in the last century, so have the data objects which the computer manipulates. In this application, such data objects will be referred to as "computer documents". Computer documents include, for example, word processing files (such as an MS Word document), markup language documents (such as HTML or XML files), database records, graphics/image files, and audio/video files.

Furthermore, the technology of computing and the technology of communication has been going through a process of merging—a process in which the distinctions between the technologies of the telephone, the television, the personal computer, the Internet, and the cellular phone are increasingly blurred, if not meaningless. The functionalities of what were once separate devices are now freely shared between and among devices. One's cellular phone can surf the Internet, while one's personal computer (PC) can make telephone calls.

In U.S. patent application Ser. No. 10/697,468 ("the '468 application"), from which the present application claims priority, the present inventor disclosed a method by which web browsers are provided with the capability and GUI functionality to act upon and use telephone numbers which appear on web pages. While a web page is being downloaded, it is parsed to determine whether there are any telephone numbers present on the web page, and all found instances of telephone numbers are highlighted when the web page was rendered, thereby bringing the telephone numbers to the user's attention, and indicating the additional functionality available for those highlighted numbers. In the specific implementation described in the '468 application, the user could left-click a highlighted telephone number to call the number using telephone connection software such as Avaya's IP-phone. If right-clicked, an option menu would appear, allowing the user to select one of a group of actions to perform on the telephone number (such as saving the telephone number in memory, or forwarding it to an address book or another user, etc.).

The '468 application was directed to markup language documents, i.e., computer files that are rendered, accessed, and/or manipulated by a markup language document browser. However, such a telephone number capability and GUI functionality is desirable for all types of computer documents, not merely markup language documents. For example, when reading an e-mail or a word processing document, or reviewing a spreadsheet, the capability and GUI functionality of recognizing, highlighting, and acting upon any instances of telephone numbers would be both practical and useful for the user.

It would also be useful if the telephone number could be saved, for future use. In this case, it would also be useful if the telephone number could be saved with some information to give context to the telephone number, such as a name or other identification associated with the telephone number, to enhance the value of the telephone number itself.

SUMMARY OF THE INVENTION

One object of the present invention is to provide a method for identifying, highlighting, and providing the capability to act upon, all instances of telephone numbers in any type of computer document, together with information which provides context for the telephone number, in which the action includes the ability to schedule a communication session with the telephone number, either immediately or at a later time; send a facsimile transmission to the number (if it is a fax number); send a short message service (SMS) message or instant message (IM) to the number; or send the telephone number directly to a separate device (such as a telephone or PDA) via suitable means (such as IrDA or Bluetooth transmission) or to multiple devices (as, for example, by a WAP-push).

Another object of the present invention is to provide a method for a user to act upon more than one uncovered telephone number simultaneously.

There are many other objects besides the few listed above, as will be made explicitly and/or implicitly clear to one of ordinary skill in the art when reading this specification and the claims appended hereto.

These and other objects are substantially achieved by the presently preferred embodiments of the invention, which provide a method for (a) automatically detecting any telephone number present in any computer document (e.g., a Microsoft Word file, a Microsoft Excel spreadsheet, a Microsoft Power Point presentation, a Microsoft Outlook email, etc.); (b) highlighting any detected telephone numbers in the computer document so as to indicate their presence to the user, and to indicate that functionality is available for the highlighted telephone number; and (c) performing one or more desired operations upon any highlighted telephone number with only one or more actions on the viewer/user's part, where such functionality is not necessarily native to said computer document. Such desired operations may include: storing the telephone number together with context information to provide added meaning to the telephone number; transmitting the telephone number, together with the context information, to a designated piece of hardware or software in order that the designated piece of hardware/software perform a desired action either with or upon the telephone number; the ability to schedule a communication session with the telephone number, either immediately or at a later time; send a facsimile transmission to the number (if it is a fax number); send a short message service (SMS) message or instant message (IM) to the number; or send the telephone number directly to a separate device (such as a telephone or PDA) via suitable means (such as IrDA or Bluetooth transmission) or to multiple devices (as, for example, by a WAP-push) and providing the user with a menu of options for what action to perform with or upon the detected instances and the context information.

It should be understood that the steps in the methods described herein may be performed in either one location or many locations, by either one device or many devices, and that different devices may perform different steps. Of course, the order of the steps may also change, depending on the particular embodiment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, where like numerals indicate like objects, and like digits within different drawings indicate similarity, but not identity, between objects/components, where:

FIG. 2A is an exemplary illustration of a web page in a web browser GUI having highlighted telephone numbers with provided functionality according to a first preferred embodiment of the present invention;

DETAILED DESCRIPTION OF THE PRESENTLY PREFERRED EMBODIMENTS

The method according to the presently preferred embodiments will be generally, i.e., conceptually, described with reference to the flowcharts in FIGS. 1A-1B-1C, while three preferred embodiments will be described in reference to the exemplary screen shots and schematic diagrams of FIGS. 2A-2B (for a computer document such as a markup language document), FIGS. 3A-3B (for a computer document such as a word processing file), and FIGS. 4A-4B (for a computer document such as an e-mail).

Figure 1A:
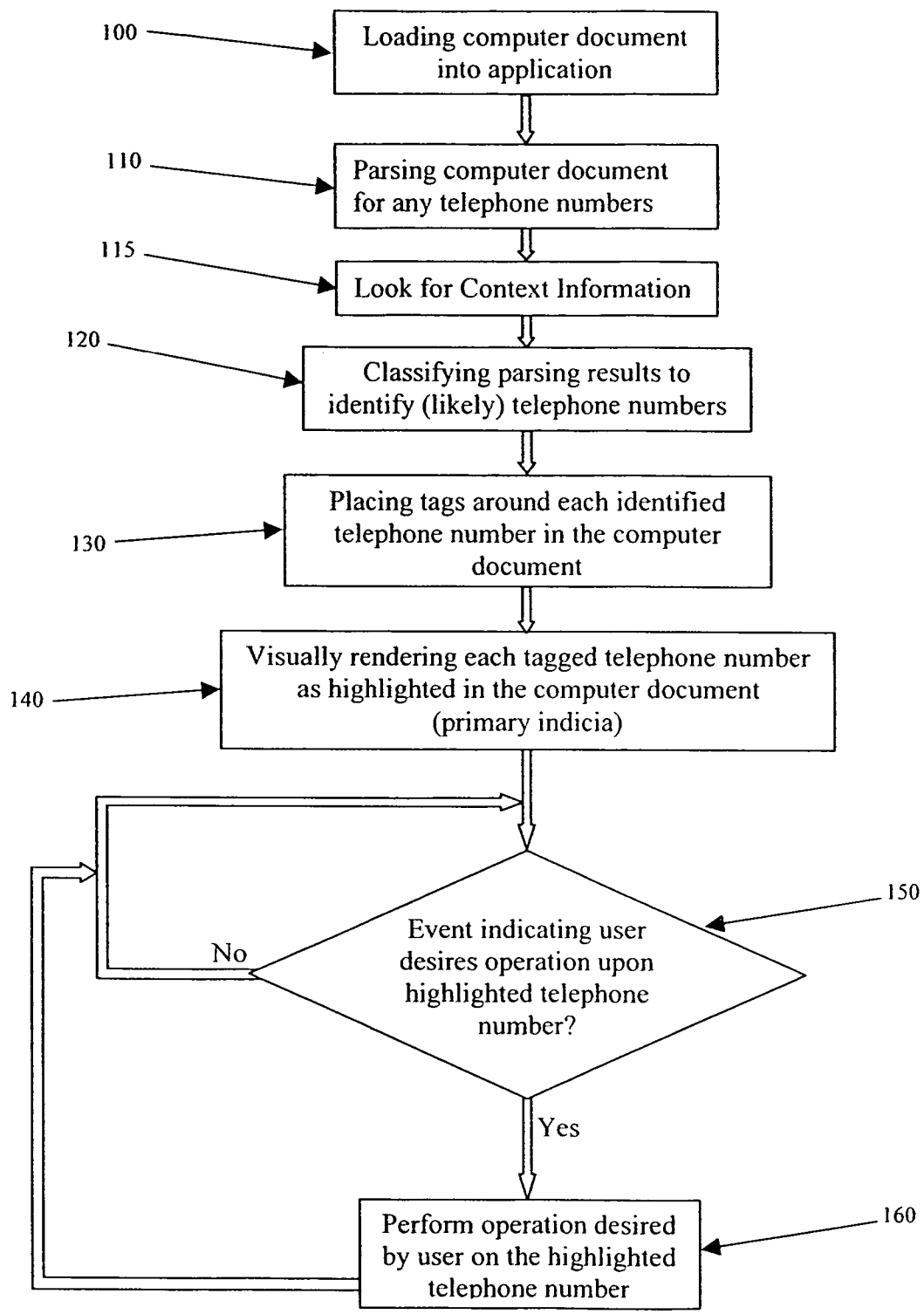
FIG. 1A is a flowchart of a method for automatically detecting, highlighting, and providing functionality for, telephone numbers in a computer document according to a general conceptual embodiment of the present invention.

FIG. 1A is a general schematic flowchart of the conceptual steps in the presently preferred embodiments; thus, the steps therein may be performed in a different order, or some steps may be combined or a single step separated into two or more sub-steps. In other words, the present invention is not intended to be limited to the order, the number, or overall structure of steps in FIG. 1A (or FIGS. 1B-1C, for that matter). Furthermore, the appearance of the exemplary computer documents in FIGS. 2A-3A-4A or the particular structures depicted in the schematic diagrams of FIGS. 2B-3B-4B are not intended to limit the present invention in any way, shape, or form. Although the three presently preferred embodiments are referred to as "first", "second", and "third" herein, it is not intended as any sort of limitation on the number and variety of possible embodiments according to the present invention.

Figure 1B:
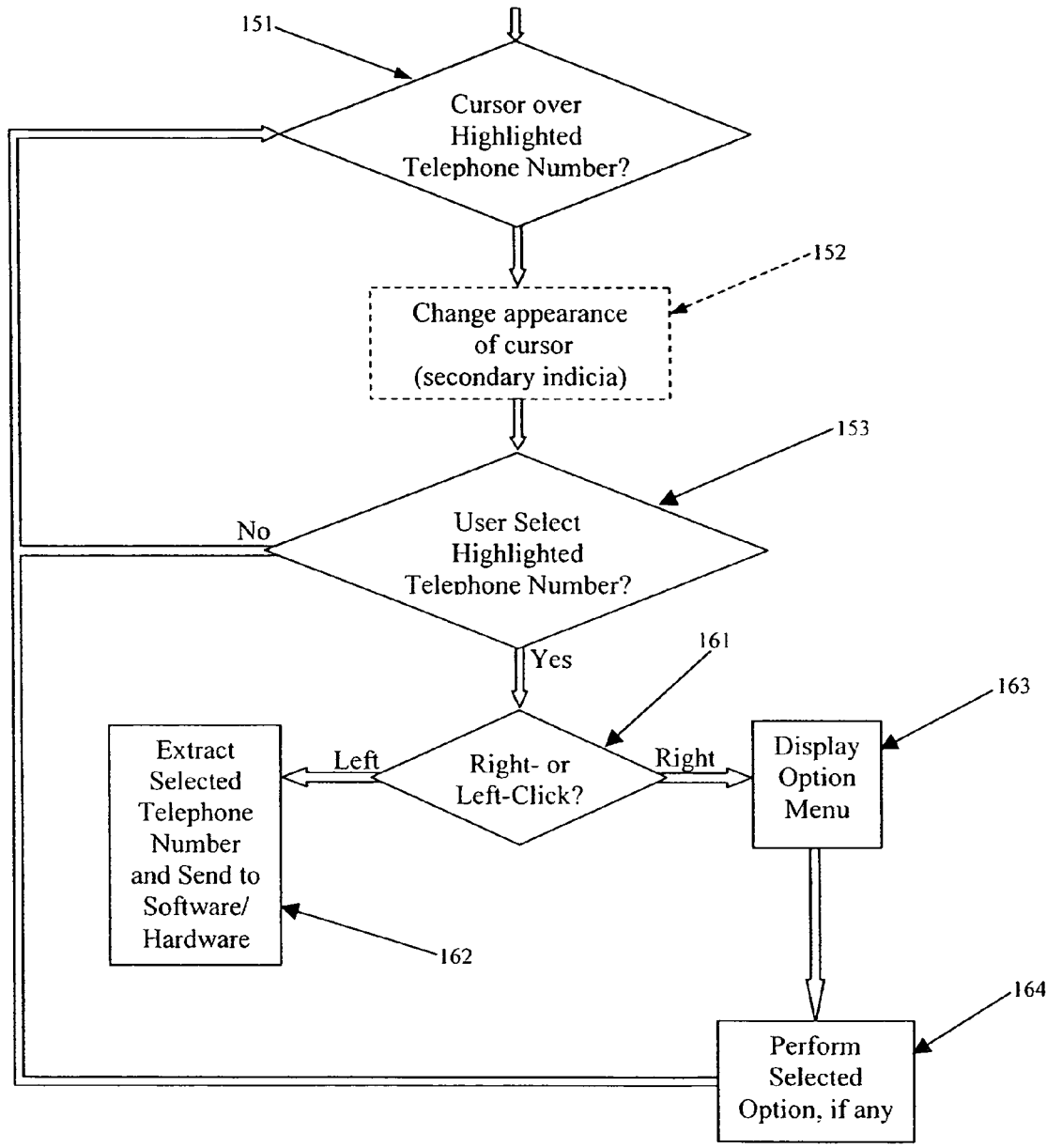
FIG. 1B is a flowchart of a specific implementation of steps 150 and 160 in FIG. 1A according to a general conceptual embodiment of the present invention.

FIG. 1B is a flowchart showing some of the possible sub-steps comprising two specific steps in FIG. 1A.

Figure 1C:
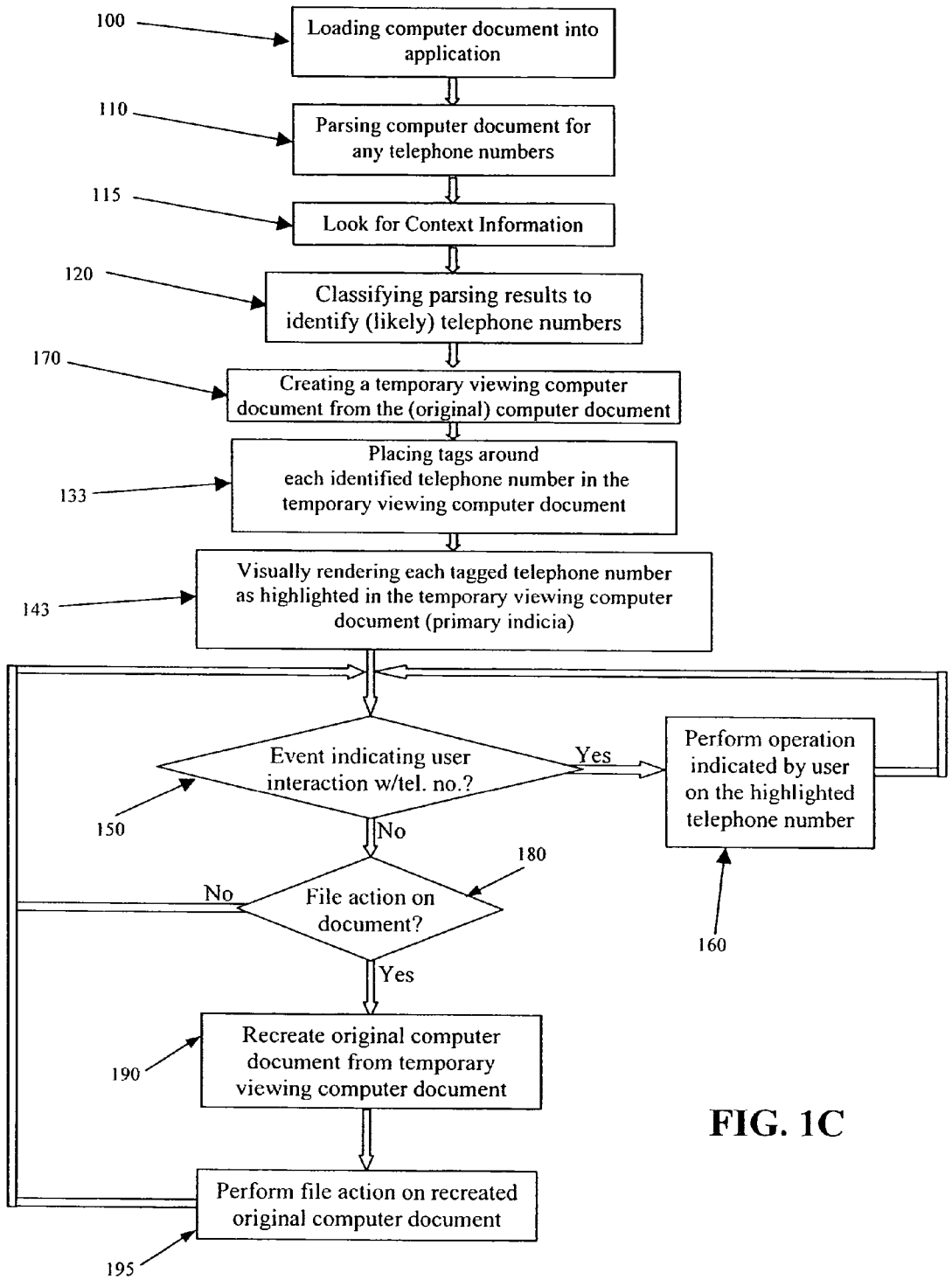
FIG. 1C is a flowchart of a method for automatically detecting, highlighting, and providing functionality for, telephone numbers in a computer document, wherein the integrity of the original computer document is maintained. according to another general conceptual embodiment of the present invention.

FIG. 1C is a general schematic flowchart, like FIG. 1A, with additional steps for embodiments in which it is important to keep the integrity of the computer document intact. In such embodiments, it is desirable to be able to return the computer document to its original format before any particular "file action" is performed on the computer document. "File actions" include, for example, saving, forwarding, copying, or any other operation where the original format of the computer document is needed (or desired).

In the presently preferred embodiments of the present invention, telephone numbers are detected in a computer document being opened in an application, any detected telephone numbers are highlighted in the opened computer document in order to indicate to the user that additional functionality is available for the detected telephone numbers, and the document user/viewer may indicate that certain action(s) upon or with the telephone numbers is/are desired by the user/viewer. In the presently preferred embodiments, the user indicates the desired action(s) by using an input device, such as a computer mouse, and a visual representation in the GUI, such as an arrow cursor. Although the presently preferred embodiments are described in terms of a computer mouse, any input device capable of selecting an item on the computer screen may be used by the user, for example, a touchpad, a keyboard, a joystick, voice command, etc., as would be understood by one skilled in the art.

It should be understood that the method according to the presently preferred embodiments uses the functionality provided by the application to which the computer document is native. For example, for a word processing document, the word processing application provides the windows or GUIs through which the computer documents are being viewed. In other words, this invention is not directed to the creation of a new GUI, but rather using the functionality provided by the native GUI in the application, as will be made clear in the detailed descriptions below.

In step 100 of FIG. 1A, a computer document is being loaded or opened by the appropriate application for that type of computer document (e.g., a word processing program for a text document, an e-mail program for an e-mail).

In step 110, the contents of the computer document are parsed, i.e., the content of the document is broken down and analyzed so that possible telephone numbers are detected. When the computer document is being parsed, it is examined for information which may be context information for any telephone number in the computer document. This is accomplished in step 115, in which the computer document being loaded is examined for information which would permit the later identification of context information, such as, for example, the type of computer document being loaded (e.g., web page, e-mail message, word processing document, or spreadsheet) the location of the computer document (e.g., the URL of a web page, the storage location of an e-mail message, word processing document or spreadsheet) and any other information which may be desirable to establish the context of the telephone number, such as, for example, the sender, recipient and/or subject line of an e-mail message in which the telephone number was found. Depending upon the application, and the needs of the user, other types and locations of context information may be of interest, and one of ordinary skill in the art would be able to ascertain that information depending upon the needs of a particular application. When parsing the computer document, the entire contents of the computer document are analyzed. The contents of the computer document which are associated with the telephone numbers may contain context information which is of interest. To make this determination in some applications, it may be desirable to establish an information structure, such as a relational database or a hierarchical virtual tree arrangement, of the information found in the computer document, so that when it is determined that a telephone number has been found, the context information may be identified and stored. A hierarchical tree containing such information may be seen in FIG. 1D, generally at 20, in which various data points 22-40 are shown with logical connections 42-58 establishing the relationships between the various data points. Each data point may be referred to as a "node" and may be a point of origin for the tree (a "root") such as node 22, a terminal point of a branch (a "leaf") such as nodes 26, 34, 36, 40 and 42, or a branching point such as nodes 24, 28, 30 and 36 which connects to other branching points or leaves. Each node contains data and is associated with other nodes as shown in the tree structure. The mapping of such a tree is well-known on the art and so will not be described in further detail.

In step 120, the possible telephone numbers detected in step 110 are classified in order to identify the most likely telephone numbers in the group of possible telephone numbers (this will be described in greater detail below). In step 130, tags (which are not seen by the user) are placed around each telephone number identified in step 120. When the computer document is visually rendered in step 140, these tags will cause the identified telephone numbers to be highlighted in the computer document and also give these highlighted telephone numbers additional functionality (as will also be described in greater detail below). In this context, the term "highlight" denotes any form of differentiating an object on the presented computer document, most likely by changing the object's appearance, e.g. yellow highlighting, underlining, bolding, etc.

In step 150, the method awaits for an indication that the user has interacted with a highlighted telephone number in the visually rendered computer document. If an event is detected which indicates that the user has interacted with a highlighted telephone number, specifically, if the user has indicated a desired operation, the desired operation indicated by the user is performed in step 160. At any time during the method in FIG. 1A, the user may jump to another application (not shown), thereby opening a computer document and initiating the process at step 100 for that application.

FIG. 1B provides further details of a specific implementation of steps 150 and 160 in FIG. 1A. In step 151, it is determined whether the user's cursor is located over a highlighted telephone number in the computer document as visually rendered in the GUI. If the cursor is located over a telephone number, the appearance of the cursor changes in order to further indicate the available functionality for the highlighted telephone number in step 152. For example, the cursor icon could change to a telephone icon. Even in this specific implementation, step 152 is optional, as shown by the dotted lines forming the box in FIG. 1B.

In step 153, it is determined whether the user has selected the highlighted telephone number. In the specific implementation of FIG. 1B, the user's input device is a computer mouse with a left-hand and a right-hand button, whereby the user can place the cursor over a specific area on a computer screen and depressing either the left-hand button for a "left-click" or a right-hand button for a "right-click". In other implementations, there may be only one button on the computer mouse, and, instead of a right-click and a left-click, the user may depress the single mouse button either once or twice in rapid succession to indicate different choices. In less preferred embodiments, the user may have a means that can only indicate a single type of selection.

In the specific implementation of FIG. 1B, a left-click upon the highlighted telephone number automatically initiates an operation, such as calling the telephone number, and a right-click makes a popup menu appear, with various options of what action to take with or upon the telephone number. Thus, if the user made a left-click in step 161, the selected telephone number is extracted from the computer document and forwarded to another program or device. Although the presently preferred embodiments send the extracted telephone number to a program for performing IP telephony, it should be understood that the extracted telephone number may be forwarded to any kind of software (such as an address book program or the clipboard) or hardware (such as an actual telephone connected to the computer, or an output port for transmission to any other sort of device). If the target is a program, the target program may also need to be initiated or loaded in this step.

If the user has made a right-click in step 161, a menu of options is displayed to the user in step 163. This menu of options may include automatically calling the telephone number with the program (which may be equivalent to step 162). Other options include changing the telephone number (e.g., adding a prefix either for an international call or for getting a direct line out of an office) and then auto-dialing it, saving the telephone number to a specific place (e.g., an address book), saving it to the computer clipboard, etc. The selected action (or no action at all, if no action was selected) is performed in step 164.

In a preferred embodiment of the inventive method, the user is given the option of storing the telephone number with or without context information. If the user elects to store the context information, the telephone number is also stored. Specifically, the selected information is identified as a telephone number and is sent from the node in which it was found to a desired location, in a desired form, such as in the form of a contact file in a contact manager program. In this example, a new contact file is created and the telephone number is automatically placed into the correct field in the contact file so that the contact manager program will recognize the file as a new contact having the selected telephone number. Context information is then also gathered from the information structure of the computer document. For example, the data contained in nodes within a predetermined proximity to the node containing the telephone number may be recognized as providing the context information.

Figure 1D:
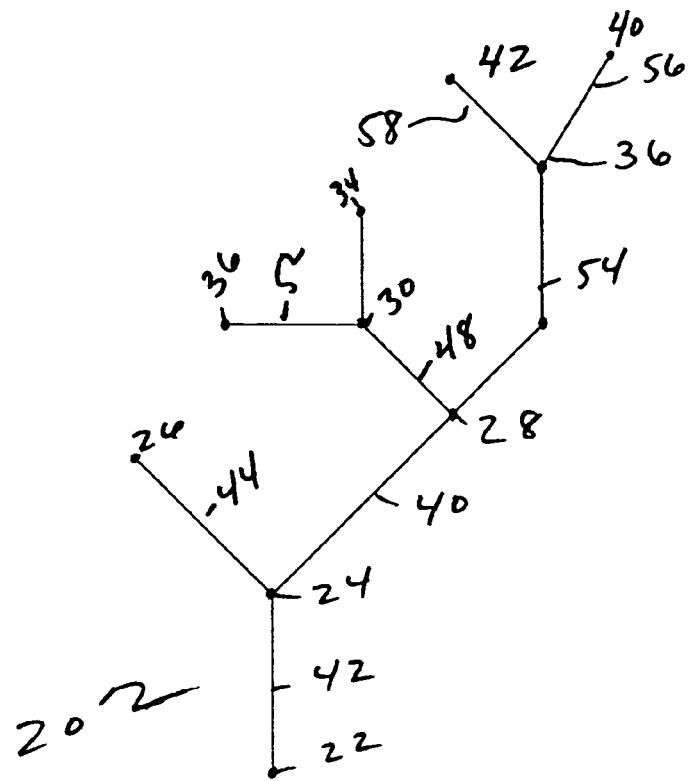
FIG. 1D is a representation of a hierarchical tree of information in a computer document according to a preferred embodiment of the present invention.

The above example is illustrated by FIG. 1D. In one embodiment of the invention, the computer document being parsed is a web page and, for this example, it is presumed that the information contained in the web page has been sorted into a virtual tree, such as shown at 20 in FIG. 1D. It is also presumed in this example that the desired telephone number is found at node 34 and the web page may be found at a specific URL which would be root node 22. The web page may be the home page for a particular company whose identity is found at node 24. Contact persons (e.g., a sales representative 26, or technical support contact 28) may be identified in the web page giving the user the opportunity to contact the identified individuals. In the case of the technical support contact 28, the contact information may include the hours during which technical support is open (contained in node 30), a telephone number 34 and an e-mail address 36. Presuming that the user does not wish to contact technical support personnel immediately, but may be interested in contacting them at a later date without having to find the web page containing the telephone number again, it would be useful to permit the user to save the located telephone number and the context information, such as the hours at which the technical support number may be called, the name of a particular individual, and the like. This would then, in this example, be considered "context information", i.e., information found in the computer document in which the telephone number is present that serves to give added meaning or "context" to the telephone number. The context information may be identified by its "physical" proximity to the telephone number in the context of the hierarchical tree or by its hierarchical relationship to the telephone number, depending upon the application.

In this example, the context information for the user would comprise the information found within a predetermined number of nodes of the telephone number, either "up" or "down" the tree. This proximity could be varied by the user to gather more or less information as desired, and may be varied, depending upon the application, "on the fly", i.e., while the context information is being gathered.

In other examples, it may be desired to save context information not based upon its relative proximity to the telephone number, but rather based upon its "absolute" position in the hierarchy, such as the "root" URL 22 of the web page, no matter how "far" node 34 containing the telephone number may be from the root 22 in tree 20. This may also be done, depending upon the dictates of the application, and the person of ordinary skill may make that determination without undue experimentation.

Presuming the user determines that the context information identified is satisfactory, the user may then direct the telephone number to be saved together with the context information. The desired telephone number may be stored as a contact file in an existing contacts manager program (e.g. as Outlook), and would therefore be saved in the form and location of a file suitable for use by the user's contact manager. The context information may be recognized as filling certain standard fields of such a file, such as name, address, or the like, and would therefore be stored in a file in the appropriate field thereof so as to be recognized by the program as information of the relevant type. The user may also be given the option of not storing the context information, or of storing it in a different location.

If the context information is not stored automatically in a file of a predetermined type, the context information may be stored at a location related to the location in which the telephone number is stored, such as in a location at a predetermined relationship to the telephone number (e.g., as adjacent thereto) or at another location linked to the telephone number by a pointer.

In yet another embodiment, the user may be given the option of adding context information manually, for example where the "context" is not found in the computer document itself but is added by the user (e.g., where the technical support number being stored relates to "my son's computer" or "my office computer", to differentiate it from other technical support numbers which may also be stored).

In any event, the inventive method permits this context information to be stored with the telephone number, in a manner which enables the user to recall the telephone number and the context information.

According to still another embodiment of the invention, if the user is given the option of establishing a telephone connection directly from the application, the connection may be established via the user's computer, such as through a computer-to-computer connection. One type of such connection is through a voice over internet protocol, (VOIP) for example the Session Initiation Protocol (SIP).

If the telephone call is established via a connection directly from the user's computer, the context information may be transmitted to the receiving device, for example the screen of a computer which corresponds to the number being dialed, or a database associated with the telephone number being dialed. In this instance, the context information may inform the called computer of the context in which the caller discovered the telephone number. This may be useful if the telephone number was found in an advertisement, so that the receiving party may track the effectiveness of various advertisements in promoting active sales leads. The context information may also be sent to any other kind of receiving device, such as a fax machine, or to a telephone which receives the phone call (such as through the use of the "Caller-ID" feature of the receiving telephone), so that the receiving telephone may identify the caller as having been referred to the receiving telephone number from a specific source.

Transmitted context information may also be used to transmit the type of document in which the telephone number was found, such as a web page advertisement, a word processing document, a spreadsheet or an e-mail. The context information in this latter case may include the sender of the e-mail, the recipient(s) thereof or the "subject" line of the e-mail, so that the receiving party may use the context information to determine how best to respond to the telephone call, or to evaluate the relative effectiveness of different types of solicitations of telephone calls.

Returning to FIG. 1B, after either the appropriate left-click or right-click action is performed in step 162 or step 164, respectively, the process returns to monitoring in step 151.

As mentioned above, FIG. 1C is a general schematic flowchart like FIG. 1A, but FIG. 1C has additional steps for embodiments in which the integrity of the computer document is preserved in order that the original format of the computer document may be used in any file actions (e.g., saving, forwarding, copying, or any other operation where the original format of the computer document is needed or desired). In these embodiments, a provisional computer document is used in order to visually render the computer document for the user, so that the tags for highlighting and functionality are placed into this provisional computer document rather than the original computer document. In FIG. 1C, the original computer document is modified to create the provisional viewing computer document, and then the original computer document is recreated from the provisional viewing document, but other embodiments may store the original computer document and destroy the provisional viewing computer document when it is no longer being presented to the user. Furthermore, the provisional viewing computer document may be stored permanently so that either the process does not need to be repeated each time the user views the computer document, or the provisional computer document can be used to store additional information, such as if a call was made to one of the highlighted telephone numbers, and when. In one embodiment, there may be a value added service which performs the steps and stores the provisional viewing computer documents for use by user clients.

In FIG. 1C, steps 100-110-115-120 are performed as described in reference to FIG. 1A. In step 170 of FIG. 1C, the provisional viewing document is created from the original computer document. As will be described in reference to the third preferred embodiment below, the original computer document may be a plaintext e-mail, while the provisional viewing computer document may be a markup language document (so that it may be used to render the highlighted telephone numbers in the e-mail GUI, and provide the requisite functionality).

Although step 170 appears after step 120 in FIG. 1C, the step of creating the provisional viewing computer document may be performed at an earlier time during the method (such as simultaneously with, or immediately after, step 100). Furthermore, in the third presently preferred embodiment of the invention, step 170 may only occur if one or more instances of telephone numbers are found on the computer document (or on the provisional viewing computer document).

In those embodiments in which the original computer document is preserved, the context information may include information which is present in the original computer document but not in the provisional document, such as stripped metatags or "salt" tags which are not searched for the actual telephone numbers. In such an embodiment, the definition of the proximity of the context information would indicate that the context information is found in the metatag in the original computer document. This may arise where the desired context information is, for example, information which is not displayed in the computer document, but is embedded therein.

In step 133 of FIG. 1C, tags are placed around each telephone number identified in step 120 in the provisional viewing document. The provisional viewing computer document is used to visually render the computer document in step 143, whereby the identified telephone numbers are highlighted in the GUI given additional capabilities. In step 150, the method awaits an indication that the user has interacted with a highlighted telephone number in the visually rendered provisional viewing computer document. If an event is detected which indicates that the user has interacted with a highlighted telephone number, specifically, if the user has indicated a desired operation, the desired operation indicated by the user is performed in step 160.

However, if it is indicated in step 180 that the user (or the system, etc.) is going to perform a file action (e.g., saving the computer document), the original computer document is recreated from the provisional viewing computer document in step 190. The file action is then performed on the recreated original computer document in step 195. As stated above, in other embodiments, the original computer document may never be destroyed (as it is when modified in step 170 to become the provisional viewing computer document), but rather stored while the provisional viewing computer document is being used to render it. Furthermore, in embodiments where the original document is modified in step 170 to create the provisional viewing computer document, the original computer document is recreated in step 190 without affecting the provisional viewing computer document (i.e., the provisional viewing computer document remains intact—is still being used to visually render the document in the GUI).

Three presently preferred embodiments are described below: a "web-dial" embodiment in which the computer document is a markup language document (specifically, an HTML document) is described with reference to FIGS. 2A-2B; an "office-dial" embodiment in which the computer document is any which can be used in a suite of productivity applications (specifically, files used by a productivity suite including a word processing program, a spreadsheet program, and a slide/visual presentation program) is described with reference to FIGS. 3A-3B; and an "e-mail-dial" embodiment in which the computer document is a transmitted message (specifically, an e-mail) is described with reference to FIGS. 4A-4B.

Figure 2A:
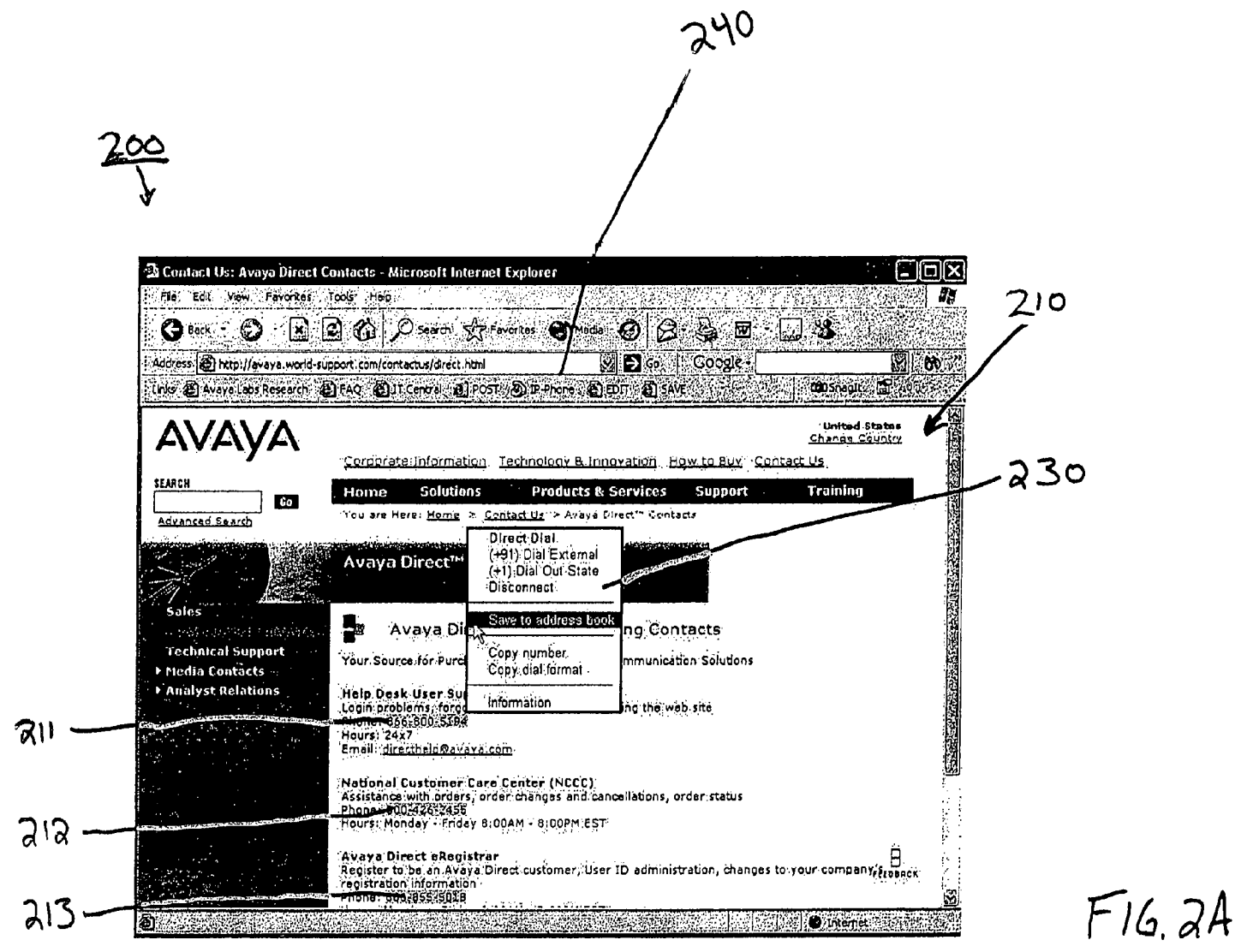
Figure 2B:
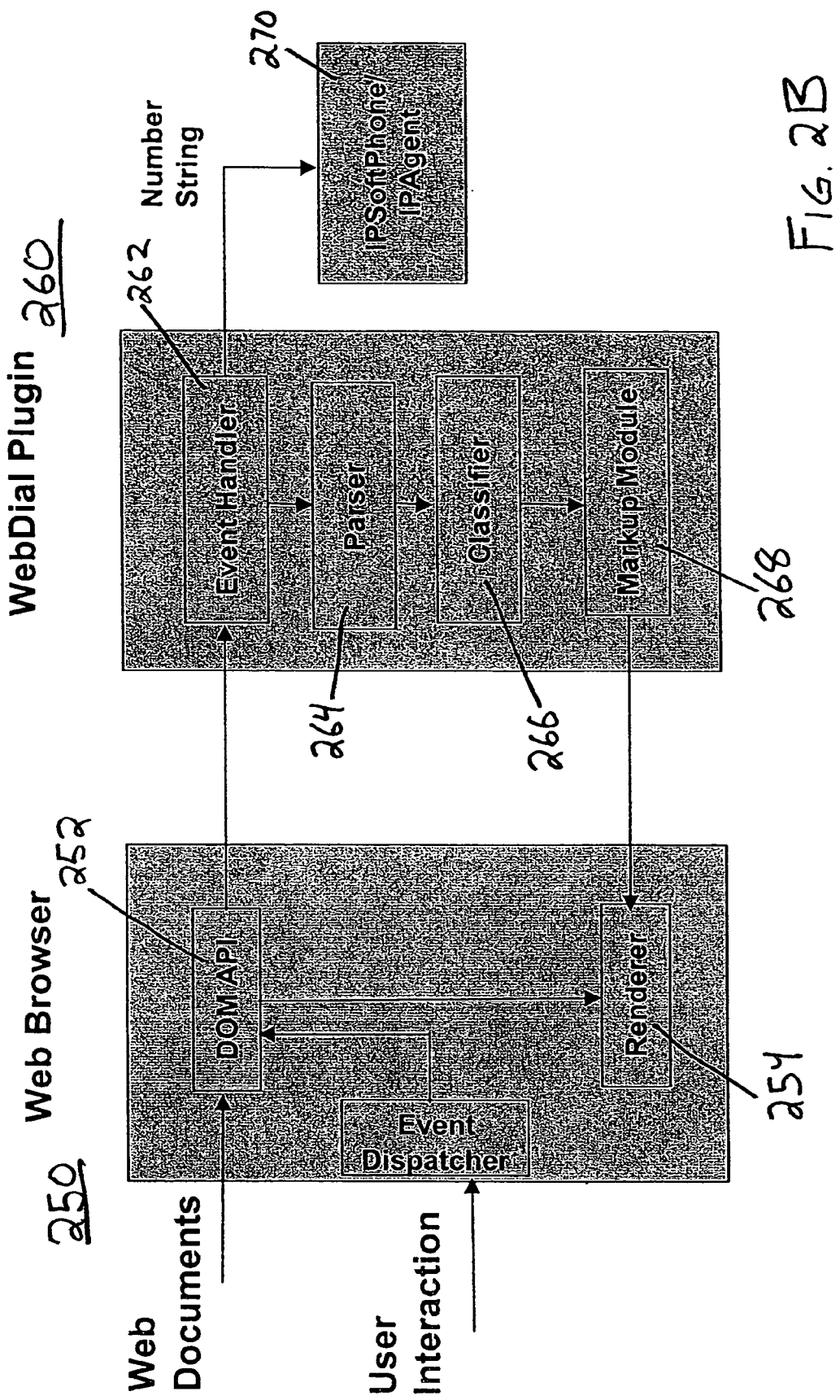
FIG. 2B is a schematic diagram of the components which identify, highlight, and provide functionality for, telephone numbers in a markup language document, such as is seen in the example of FIG. 2A, according to a first embodiment of the present invention.
Figure 3A:
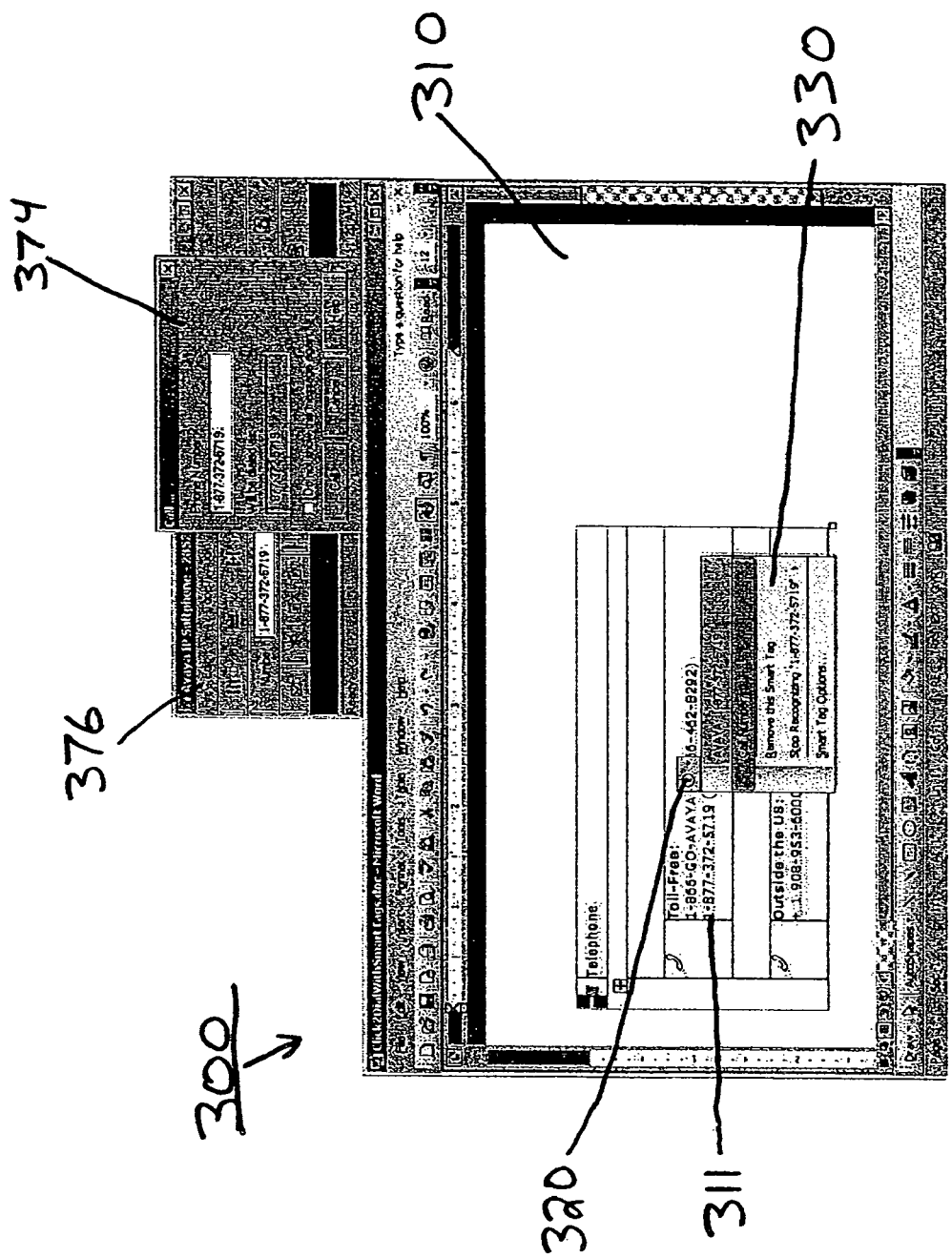
FIG. 3A is an exemplary illustration of a computer document in a word processing GUI having highlighted telephone numbers with provided functionality according to a second preferred embodiment of the present invention.
Figure 4A:
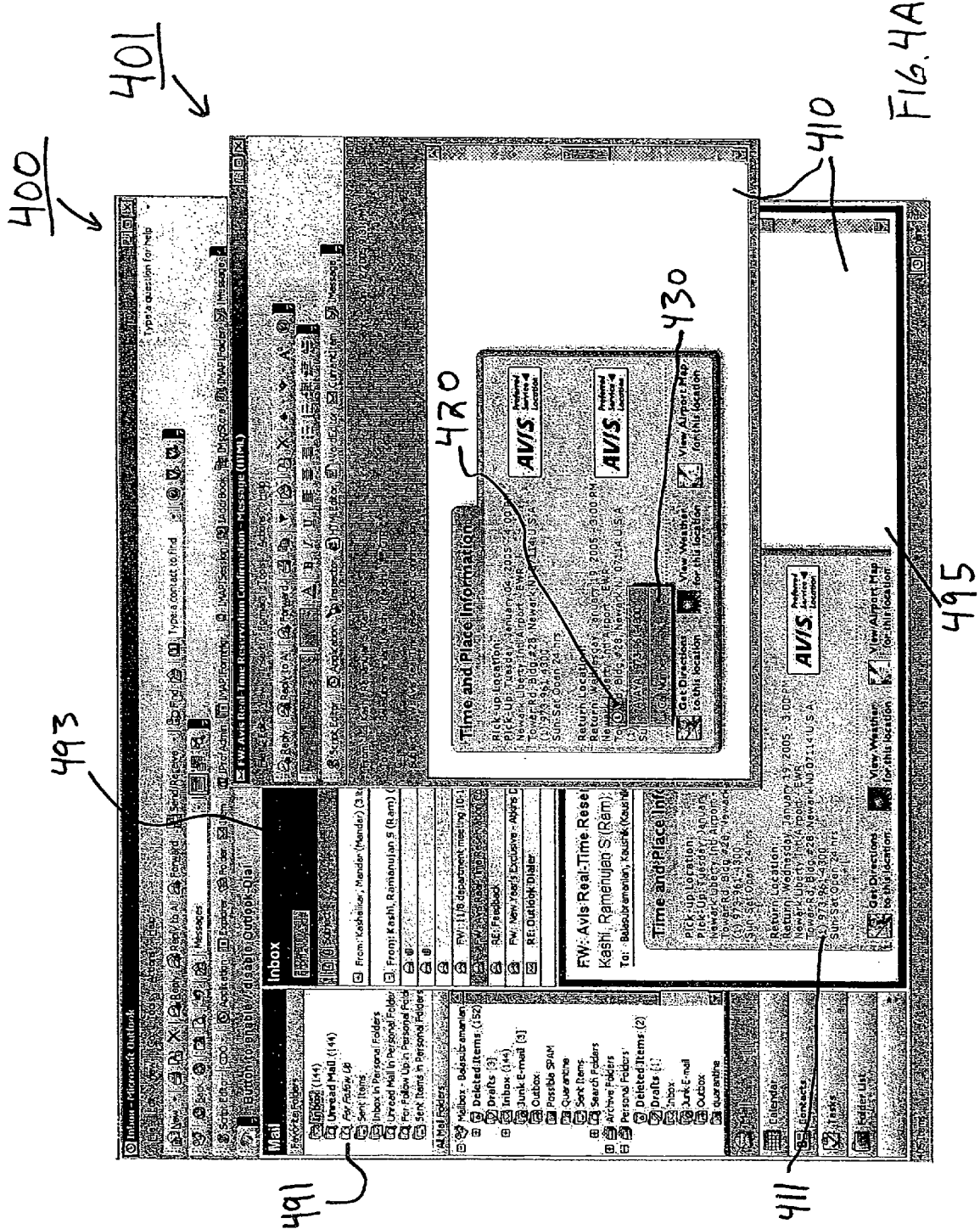
FIG. 4A is an exemplary illustration of a computer document in an e-mail GUI having highlighted telephone numbers with provided functionality according to a third preferred embodiment of the present invention.

Although the screen shots of FIGS. 2A, 3A, and 4A are from the monitor of a desktop personal computer, the present invention may be implemented on any type of computing device, including, for example, laptop computers, Personal Digital Assistants (PDAs), telephones, appropriately-equipped television receivers, or any other appropriately-equipped appliance.

Web-Dial

In the first presently preferred embodiment of the present invention, as shown in FIGS. 2A-2B, the computer document is a markup language document, such as a web page, which is being opened in a browser. The first presently preferred embodiment is similar to the invention described in the aforementioned U.S. patent application Ser. No. 10/697,468 (the '468 application), which was also invented by the present inventor, and from which the present application claims priority. That application has been incorporated by reference, and may be referred to for guidance on some particular details of the first presently preferred embodiment herein; however, there are differences between the implementation of this embodiment and the implementation in the '468 application, as will be apparent to one skilled in the art when reading the following descriptions.

In FIGS. 2A-2B, the markup language document is an HTML (HyperText Markup Language) document, but the first presently preferred embodiment may be applied to any type of markup language document. The "hypertext" in HTML refers to the content of web pages—more than mere text, hypertext (sometimes referred to as "hypermedia") informs the web browser how to rebuild the web page, and provides for hyperlinks to other web pages, as well as pointers to other resources. HTML is a "markup" language because it describes how documents are to be formatted. Although all web pages are written in a version of HTML (or other similar markup languages), the user never sees the HTML, but only the results of the HTML instructions. For example, the HTML in a web page may instruct the web browser to retrieve a particular photograph stored at a particular location, and show the photograph in the lower left-hand corner of the web page. The user, on the other hand, only sees the photograph in the lower left-hand corner. HTML is also a variant of XML (eXtensible Markup Language). The difference between the two markup languages is that HTML was designed to display data and focus on how data looks, whereas XML was designed to describe data and focus on what data is. XML is a universal storage format for any type of data and files make them portable between different hardware, software, and programming languages.

In FIG. 2A, a screen shot of a GUI window 200 of a standard web browser (in this case, Internet Explorer) is shown with a loaded web page 210. In FIG. 2A, there is a 'bookmarklet' 240 labeled "IP-Phone" in the Links toolbar at the top of the web browser GUI; this bookmarklet 240 can be used to turn the Web-Dial functionality on or off. When the Web-Dial functionality is turned off, the telephone numbers are not highlighted or indicated in any way (i.e., the web page appears as it would appear in a standard, prior art web browser). Because the Web-Dial functionality has been turned on in FIG. 2A, web page 210 has been parsed and classified according to steps 110 and 120 in FIG. 1A and the telephone numbers that were identified in step 120 are highlighted in FIG. 2A according to step 140 in FIG. 1A. Specifically, three telephone numbers 211, 212, and 213 can be seen highlighted on web page 210.

In the first presently preferred embodiment, when the cursor is located over a highlighted telephone number, it changes from its usual arrow shape to an icon indicating that particular functionality is available for the highlighted telephone number if the user right- or left-clicks. In FIG. 2A, the user has right-clicked highlighted telephone number 211, thereby causing menu 230 to pop up, in accordance with step 163 in FIG. 1B. If the user had left-clicked, highlighted telephone number 211 would have been extracted and sent to an IP telephony program (i.e. step 162 in FIG. 1B).

Although menu 230 is shown immediately above and to the right of highlighted telephone number 211 in FIG. 2A, menu 230 may appear at other positions on the computer screen. The options presented to the user in pop up menu 230 of FIG. 2A are "Direct Dial", "(+1) Dial External", "(+1) Dial Out State", "Disconnect", "Save to address book", "Copy number", "Copy dial format", and "Information". In FIG. 2A, the user has moved the cursor to select the "Save to address book" option in pop up menu 230. The first three options in pop up menu 210 are self-explanatory.

"Disconnect" lets the user disconnect the phone line after a telephone call. This function would be grayed-out when the user initially selects the highlighted telephone number, as there would be no connection yet. Of course, it is also possible that after finishing a call using the IP telephony program, the user may disconnect using the IP telephony program. "Copy number" copies the number into the computer's clipboard for later use by the user. "Copy dial format" indicates that the format of the highlighted telephone number is a format that should be searched for in the future when step 220 is performed. "Information" provides information about the web-dial functionality. The "Copy Dial Format" provides the ability to learn. In the presently preferred embodiments, feedback received from the user can be used to modify or add to the search method used to detect any instance of a telephone number.

It should be understood that the user options shown in the pop-up menu of this exemplary GUI are exemplary, and that many variations regarding the options are possible: there may be greater or fewer options, or different options, such as reverse telephone number lookup, which would access a reverse phone lookup directory to verify or to obtain the address and name associated with the highlighted telephone number.

According to all the presently preferred embodiments, the user may manually select a telephone number and pass the telephone number to the IP telephony program (or perform other operations upon or with the telephone number, such as store it in an address book). To do so in the first presently preferred embodiment, the user would select the numbers on the web page using the cursor, and then click bookmarklet 360, which causes the telephone number to be sent to the IP telephony program. This manual selection is provided for those cases where the telephone numbers are not identified on the web page (and thus are not clickable), or in case a telephone number has been saved in temporary memory (such as the computer clipboard) and now the user wishes to dial it, or when the user has turned off the Web-Dial functionality.

FIG. 2B is a schematic diagram of components performing the functions resulting in the capability and GUI functionality shown in FIG. 2A. In FIG. 2B, a web browser 250, such as Internet Explorer, receives web documents and user input or interaction. WebDial Plugin 260 is a Browser Helper Object (BHO) that is loaded and initialized whenever a new instance of web browser 250 is started. BHOs, such as WebDial Plugin 260, are Dynamic Link Libraries (DLLs) which run in the same memory context as web browser 250 and can perform any action on the available windows and modules. The Web-Dial Plugin 260 is typically unloaded when the instance of web browser 250 is destroyed, although this may not be true in some embodiments.

Event Handler 262 in WebDial Plugin 260 listens for events occurring in web browser 250. Specifically, the Event Handler 262 listens for two events that are fired by web browser 250 at specific times: the DocumentComplete event which is fired when a web document, with all of its forms, has fully loaded into the browser; and the BeforeNavigate event which is fired when the user has performed an action which seems to require that a new web document be loaded into the web browser. Such user actions include clicking the Back or Forward buttons, or entering a new URL into the navigation bar.

If a DocumentComplete event is detected, the remaining modules in WebDial Plugin 260 go to work. Specifically, Parser 264 parses the run-time Document Object Model (DOM) of the downloaded document through the DOM application programming interface (API) 252. The Document Object Model (DOM) is a platform- and language-neutral API standard that allows programs and scripts to dynamically access and update the content, structure, and style of documents (both HTML and XML). Using DOM API 252, a document can be further processed and the results of that processing can be incorporated back into the page presented to the user by the renderer 254. In essence, the DOM API provides a tree-like model, or framework, of the objects in a document, i.e., when an XML/HTML document is loaded into an application (such as a web browser like Internet Explorer), the DOM API creates a DOM of the downloaded document in the form of an in-memory tree representation of the objects in that document. Using the DOM API, the runtime DOM may be used to access, traverse (i.e., search for particular objects), and change the content of the downloaded document.

The DOM of the downloaded web page in the first preferred embodiment may operate as the provisional viewing computer document discussed in reference to FIG. 1C above.

By contrast with the embodiment described in the '468 application, the WebDial Plugin 260 of the first presently preferred embodiment herein does not insert Javascript code into the DOM API 252 of Web Browser 250. Instead, modules within WebDial Plugin 260 perform most of the work. Naturally, these modules are written in C++ as part of a DLL rather than Javascript code to be inserted in the DOM, as in the embodiments described in the '468 application.

Parser 264 parses the DOM of the downloaded document to find any instances of telephone numbers. Specifically, parser 264 uses regular expression parsing rules designed to pick up the various formats that phone numbers can take within a computer document. An exemplary parsing implementation is described below; however, it should be noted that this parsing implementation is only one of a myriad of possible search expressions when implementing the present invention.

The following characteristics were used to define North American based telephone numbers:
a) The area code is 3 digits and can sometimes be in brackets;
b) The subscriber number is seven digits long and is clustered into two groups comprised of a first group of three digits and a second group of four digits;
c) The two groups are separated by one of a space, dash, dot, or a middle dot, or are not separated at all;
d) The area code and the subscriber number are separated by one of a space, dash, dot, or a middle dot, or not separated at all;
e) The phone numbers may begin with a + character followed by the digit 1, the + character followed by a space and then the digit 1; and
f) The optional '+1' and '+1' in (e) can be separated from the 10 digit phone numbers with one of a space, a dash or a dot.

An example of a regular expression string which satisfies the above characteristics is:

/\+? ?1? ?-?\.?\(?\d{3}\)?\-?-?\.? ?\d{3}-?.?\-? ?\d{4}/gi

The regular expression string is bounded by the "/" character. Next the \+ matches the + character. The plus has a "\" in front to specify we mean an actual "+" character and not the special character. This is followed by the "?" character which means that it matches zero or one instance of the "+" character. This is followed by the space and "?" character which matches zero or one instance of a space character. The rest of the regular expression captures the characteristics that we desire to capture. At the end the "g" character indicates that a global match be performed to get all instances of such pattern and the "i" character makes the match case insensitive.

The international numbers can be quite varied in format and it was discovered to be best if the parsing was limited to the characteristics described below:
a) The number begins with a "+" character, followed by 1 to 3 digits which signifies the country code, then followed by an optional space character;

b) A 1 to 5 digit string comprises the area code and can sometimes be in brackets; and
c) The 1-5 digit area code is followed by four groups of digits, in which the groups are separated by a zero or one instance of a space character.

An example of a regular expression string which satisfies the above characteristics is:

/(\+\d{1,3} ?)(\(\d{1,5} ?)\d{1,5}) ?\d{1,6} ?\d{0,7} ?\d{0,5} ?\d{0,5}/gi;

With these two examples, it should be clear how such a string can be written and how the parsing can be performed. The same principles may be used in a similar manner to implement parsing in order to detect other types of data on any type of computer document.

Once parser 264 has completed its task, the results, if any, are output to classifier 266. Classifier 266 extracts lexicalized contextual features for each result, i.e., for each possible telephone number in the computer document, it extracts local features from the computer document to determine the likelihood that the parser-selected number is indeed a telephone number. For example, if the possible telephone number is preceded by certain keywords, such as "telephone", "phone", "mobile", "cell", and "fax", it strongly indicates that the current number is in fact a phone number. As another example, icons, such as a telephone image, may also increase the likelihood that the number is a telephone number. Additional search parameters are possible, such as the formatting of the page around the number (e.g., if it appears to be part of a contact block on that webpage), and other terms and icons, when searching for instances of telephone numbers, as would be known to one of ordinary skill in the art.

The classifier 266 can be pre-trained (i.e., before installation) by performing statistical analyses of web pages, and specifically the typical format of, and the contextual features around, telephone numbers found therein. It's also possible that the classifier 266 can be trained by the particular user of the WebDial Plugin 260, by having a web interface for the user to identify telephone numbers (and telephone number formats and contexts), and thereby train, the classifier 266 in WebDial Plugin 260. The present embodiments of the invention use a Support Vector Machine as classifier 266, but any conventional classifier can be used, as would be known to one of ordinary skill in the art. Even without an entire user training web interface, classifier 266 can receive feedback from the user and then use that feedback in order to modify or add to the search method used to detect any instance of a telephone number. Furthermore, it is contemplated that search parameters may be under the control of the user, e.g., the user may have the ability to turn on and off certain search parameters, in addition to the user defining words, terms, formats, or contexts to look for in the web page.

Having analyzed the output of parser 264 to determine which of the parsed telephone numbers is most likely to be a telephone number, classifier 266 then outputs the most likely numbers to be telephone numbers to Markup Module 268, which ensures that these most likely telephone numbers in the downloaded document are highlighted and made clickable.

Markup Module 268 creates a span tag which is placed around the telephone number in the downloaded document (or, more exactly, the DOM of the downloaded web page). The span tag is used in HTML to group inline-elements together in order to apply specific style and/or event attributes to the elements within the "span". In this case, the span tag indicates that the grouped elements, i.e., the numbers making up the phone number, will be highlighted and active upon certain cursor events. Specifically, when the cursor is over the highlighted area, the cursor turns into a telephone icon; when the highlighted phone number is left-clicked, it is interpreted as a hyperlink click which is intercepted by Event Handler 262 and results in the IP telephony program 270 being called; and, when the highlighted phone number is right-clicked, the menu 230 of options in FIG. 2A pops up.

If a click is made over one of the phone number span tags, a new type of URL is captured by the BeforeNavigate event. In accordance with the specific implementation of the presently preferred embodiments, the inventive format of this new "phone" URL comprises "phone://<stripped telephone number>". In other words, the mouse click is interpreted by the web browser as a navigation event, i.e. a call to load another web page, and thus the web browser begins the process of navigating to the page indicated by the mouse click, but instead of a conventional URL, the new inventive phone URL is captured by the BeforeNavigate event, which, in turn, is intercepted by Event Handler 262.

If a BeforeNavigate event is heard by Event Handler 262, WebDial Plugin 260 intercepts the URL to which the web browser is navigating to determine whether it is a phone URL generated by clicking on one of the highlighted telephone numbers on the webpage. If Event Handler 262 determines that it is a phone URL, WebDial Plugin 260 extracts the number string from the phone URL and sends the number string to IP Telephony program 270. The number string which makes up the highlighted telephone number may be stripped of any separator characters, such as spaces, parentheses, brackets, etc., before passing it on; however, this stripping routine is not necessary, and the presently preferred embodiments do not have such a stripping routine because the IP telephony program 270 may use some of these separator characters to properly interpret the telephone number it represents.

Thus, it can be seen that the specific implementation of the presently preferred embodiment uses the normal functions and events (e.g., the DocumentComplete and BeforeNavigate events, the BHOs and DLL functionality, etc.) of the web browser in a new, inventive manner in order to provide some of the features of the present invention.

Although FIGS. 2A-2B show an Internet Explorer/Windows implementation of the first presently preferred embodiment, all of the presently preferred embodiments of the present invention is by no means limited to either the Microsoft Windows operating system or the Internet Explorer web browser. Other web and/or non-web browsers, such as Netscape Navigator, Apple's Safari, Mozilla, Opera, etc., may be used with all of the presently preferred embodiments.

Furthermore, although all three presently preferred embodiments are described in the context of either the Microsoft Windows operating system or one of the Microsoft software applications, it is contemplated that the present invention (and any of the three presently preferred embodiments) may be implemented in a system running any operating system, such as the Apple Mac OS, the Linux operating system, or any of the flavors of UNIX offered by the larger computer system designers (e.g., Solaris on Sun computer systems; Irix from Silicon Graphics, etc.). In other words, the present invention is platform-independent.

The first presently preferred embodiment has been described in fairly great detail above, and it should be understood that many of these specific details are also applicable in the other presently preferred embodiments, and thus, do not need to be described again. As one example, the regular expressions used by Parser 264 may also be used in the two embodiments described below. As another example, the options described in reference to the right-click pop-up menu would also be available in the two embodiments described below. In short, most of the features and functionality described above are equally applicable to the two embodiments described below, as would be understood by one skilled in the art.

Office-Dial

Figure 3B:
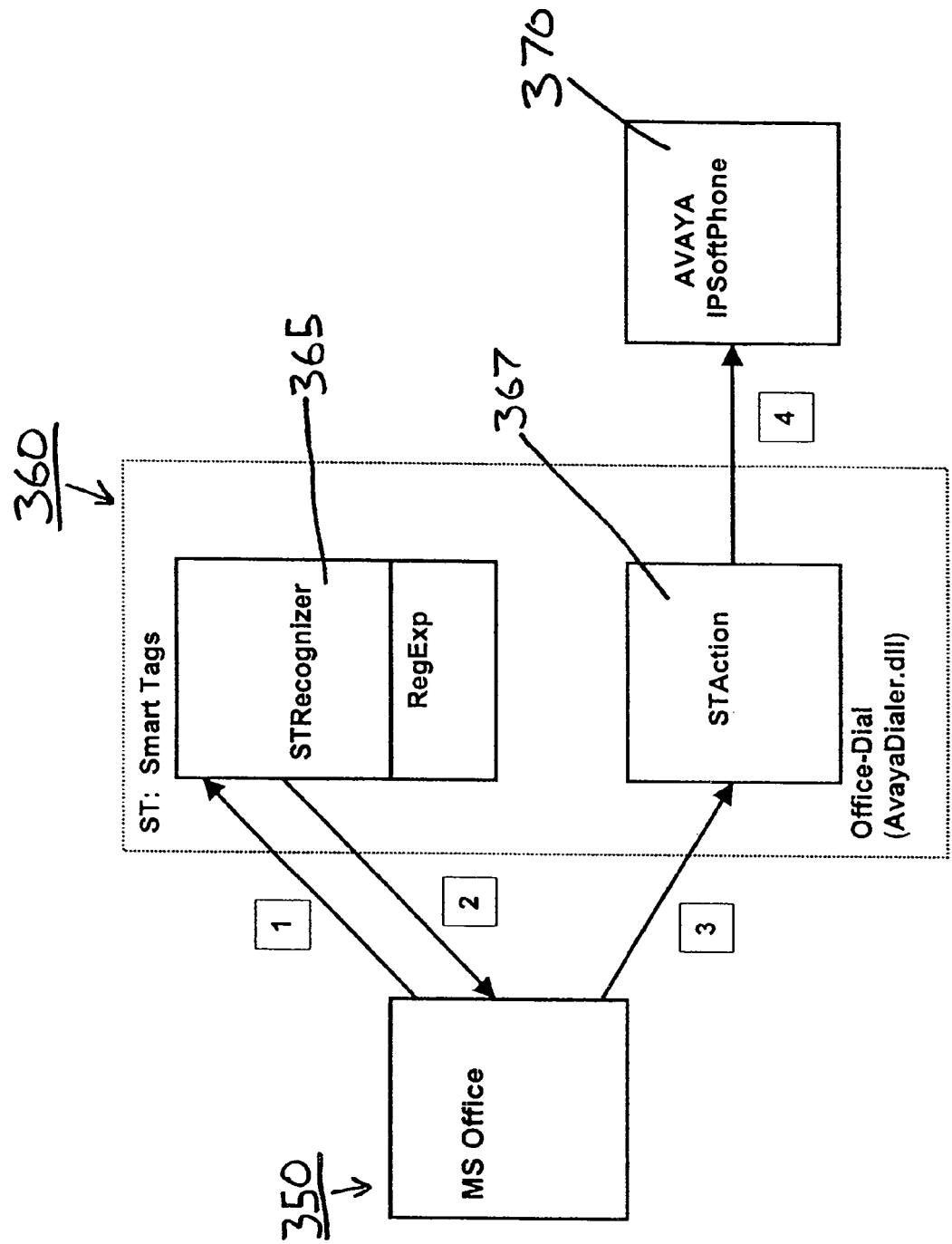
FIG. 3B is a schematic diagram of the components which identify, highlight, and provide functionality for, telephone numbers in a computer document, such as is seen in the exemplary word processing document of FIG. 3A, according to a second preferred embodiment of the present invention.

In the second presently preferred embodiment of the present invention, as shown in FIGS. 3A-3B, the computer document is an office productivity suite document, specifically, a word processing document. The exemplary word processing document in FIG. 3A is an MS Word document, although the functionality described in the second presently preferred embodiment may be used with any of the MS Office documents (e.g., MS Excel, MS PowerPoint, etc.). Furthermore, the second presently preferred embodiment may be implemented in any office productivity application, such as a word processing application, a spreadsheet application, a slide presentation application, a calendar application, etc.

In FIG. 3A, a screen shot of a GUI window 300 of a word processing program (in this case, MS Word) is shown with a loaded word processing document 310. Word processing document 310 has been parsed and classified according to steps 110 and 120 in FIG. 1A and the telephone numbers that were detected in step 120 are underlined in FIG. 3A according to step 140 in FIG. 1A. In the second presently preferred embodiment, when the cursor is located over a underlined telephone number (e.g., phone number 311), an icon labeled "i" (e.g., box 320) appears above the underlined telephone number indicating that particular functionality is available for the underlined telephone number. The "i" icon, and other features of the second presently preferred embodiment, are provided by the Smart Tags technology, as will be described in greater detail below. In FIG. 3A, the user has clicked the "i" icon 320, thereby causing menu 330 to appear, similar to the right-click option of step 163 in FIG. 1B.

Although the "i" icon 320 is shown immediately above and to the right of underlined telephone number 311 in FIG. 3A, "i" icon 320 may appear at other positions on the computer screen. The options presented to the user in pop down menu 330 of FIG. 3A are "Call Number", "Remove this Smart Tag", "Stop Recognizing "1-877-372-5719", and "Smart Tag Options". In FIG. 3A, the user has selected the "Call Number" option in pop down menu 330, thereby causing the Call dialog box 374 to appear above the MS Word GUI 300. The user has the option buttons "call", "cancel", and/or "help" in the Call dialog box 374. In addition, the Call dialog box 374 has the check box option to not show this message again" so that the next time the user selects "Call Number", the Avaya IP Softphone 376 is automatically opened and dialing commenced. In FIG. 3A, the user has selected the "Call" button in Call Dialog box 374 so the Avaya IP Softphone 376 has opened and is calling the selected number. The "Stop Recognizing "1-877-372-5719" " option in pop down menu 330 allows the underlining of telephone number 311 to disappear, as well as the telephone functionality for telephone number 311. The "Smart Tag Options" and "Remove the Smart Tag" options in pop down menu 330 will be understood when the Smart Tag architecture and functionality is described further below.

Other options could appear in pop down menu 330 in other implementations of the second presently preferred embodiment, as would be known to one of ordinary skill in the art, such as, inter alia, the options shown in pop up menu 230 in FIG. 2A.

Although not shown in FIG. 3A, a IP-phone bookmarklet may appear in other embodiments in the standard toolbar at the top of the MS Word GUI 300; this bookmarklet could be used to turn the Office-Dial functionality on or off. When the Office-Dial functionality is turned off, the telephone numbers are not underlined or indicated in any way (i.e., the word processing document appears as it would appear in a standard, prior art word processing GUI).

This implementation of the second presently preferred embodiment uses Smart Tag functionality and architecture, which will be described below with reference to FIG. 3B, to automatically search for telephone numbers in any MS Office file (including MS Word, MS Excel, MS Power Point, etc.) being presently viewed by the user, and then underlining any found telephone numbers, as well as providing the menu and option functionality, an example of which is shown in FIG. 3A. However, the parser and classifier aspects of the second presently preferred embodiment are novel, as is the general idea embodied therein.

FIG. 3B illustrates the architecture of the Smart Tags implementation of the second presently preferred embodiment in an MS Office environment. In FIG. 3B, an MS Office program 350 (in this instance, MS Word) is in communication with a Smart Tags DLL (in this instance, Office-Dial 360) which is comprised of STRecognizer 365 and STAction 367, and STAction 367, in turn, is in communication with Avaya IP SoftPhone 370. As shown by the arrows with boxed numbers in FIG. 3B, when a computer document, such as a word processing document, is downloaded into an MS Office program 350, such as MS Word, STRecognizer 365 in Office-Dial Plugin 360 parses the content of the downloaded computer document to find any instances of telephone numbers (step 1). STRecognizer 365 uses the regular search expressions in the RegExp module to search for the telephone numbers. The research string expressions would be similar to the ones described in reference to FIG. 2B above, as would be understood by one of ordinary skill in the art.

If any telephone numbers have been found, STRecognizer 365 applies Smart Tags to each found instance of a telephone number (step 2). These inserted Smart Tags provide the highlighting (i.e., underlining) of each telephone number, as well as the capabilities and GUI functionality shown in FIG. 3A. Referring back to FIG. 3A, as well as FIG. 3B, if the user puts the cursor over an underlined telephone number 311, the "i" button 320 will appear in the GUI window above the underlined telephone number, and STAction 367 will be called in order to show, and to provide the functionality for, the menu of commands 330 (step 3). If the user selects the "Call Number" button on menu 330, STAction 367 will call and provide the appropriate number string to Avaya IPSoftphone 370, which will perform the dialing and connecting (step 4).

Smart Tag technology was first introduced in Microsoft Office XP to enable users to dynamically present additional information in their computer documents. For general users of MS Office, Smart Tags are intended to boost productivity by having actions linked to keywords. Smart Tags may be used to link users to internal resources based on the type of data either in or input into computer documents in MS Office applications. For example, a purchase order number in an Excel spreadsheet may be linked to detailed information about the sale from a source on a company intranet.

Smart Tags are enabled by two simple DLLs: a recognizer module ("Smart Tag Recognizer" or "STRecognizer") and an action handler ("Smart Tag Action" module or "STAction"). When a Smart Tag-enabled application is started up, it fires up all available Smart Tag recognizer modules and action handlers. When a user either opens a computer document or provides input into a computer document, the recognizer module parses the content of the opening computer document and/or the input of the user to determine if any of the specified data type to be recognized is there. When the data type is recognized, the recognizer module inserts Smart Tags around the identified datatype, which will underline the identified data type and provide the "i" button next to the identified data type. In the second presently preferred embodiment, the STRecognizer merely identifies possible telephone numbers, while the parser and classifier functions are implemented as described herein. The action handler provides the menu options shown when the user clicks the "i" button, and provides the functionality or calls other programs to provide said functionality.

Smart Tags are similar to markup language tags and, in fact, the Smart Tags technology uses an XML namespace to enable the functionality. Thus, like markup language tags, Smart Tags are hidden inside the computer document. If they could be seen, they would appear like any other pair of XML tags surrounding the text, like: <st1:inventor>Ram Kashi</st1:inventor>. For more information concerning Smart Tags architecture and technology, please see *A Developer's Take on Smart Tags,* Bill Coan, February 2005; *Developing Simple Smart Tags,* Paul Cornell, May 2001; *Building Smart Tags in Microsoft Visual Basic .NET,* J. Sawyer, October 2001; *Developing Smart Tag DLLs,* Paul Cornell, April 2001; and *Regular Expression Support in Microsoft Office System Smart Tags,* Markus Egger, August 2003. All of these articles may be found online at the Microsoft Developers Network (MSDN) Library at msdn.microsoft.com, and all of these articles are hereby incorporated by reference in their entirety.

E-Mail-Dial

Figure 4B:
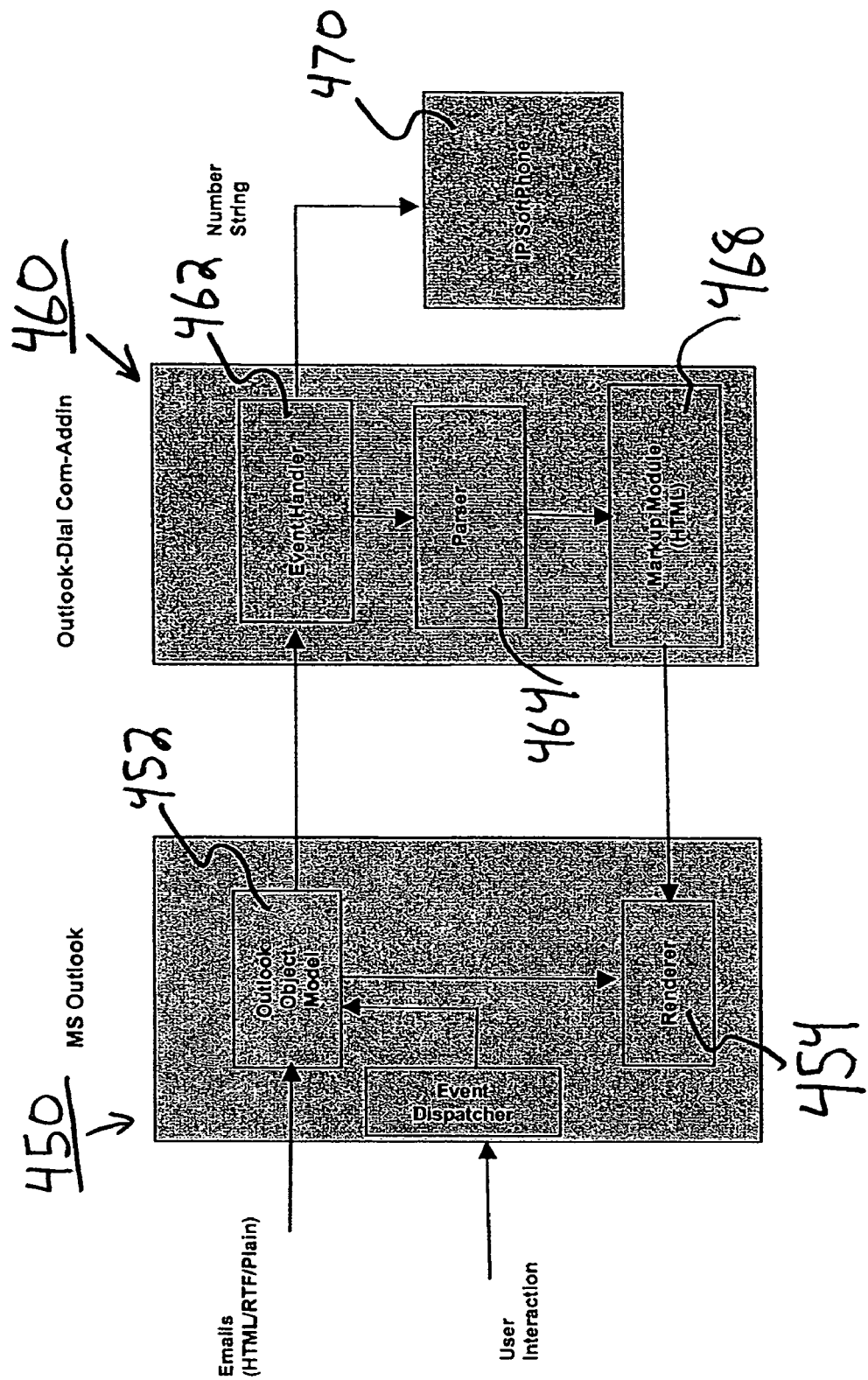
FIG. 4B is a schematic diagram of the components which identify, highlight, and provide functionality for, telephone numbers in a computer document, such as is seen in the exemplary e-mail of FIG. 4A, according to a third preferred embodiment of the present invention.

In the third presently preferred embodiment of the present invention, as shown in FIGS. 4A-4B, the computer document is a message, specifically, an e-mail which is being viewed in MS Outlook, although the functionality described in the third presently preferred embodiment may be used with other e-mail applications, such as Apple Mail, Eudora, Mozilla, Firefox, etc. In the third presently preferred embodiment, telephone numbers are automatically detected and highlighted, regardless of whether the format of the original message is Plain Text (Plain), Rich Text Format (RTF), or HTML. In order to highlight telephone numbers in any email regardless of format, the third presently preferred embodiment creates a provisional viewing e-mail at runtime in which tags can be placed so that detected telephone numbers are appropriately highlighted, and have the appropriate functionality, similar to the method of FIG. 1C. After viewing, and/or before any action is performed on the original e-mail, any placed tags are removed from the provisional viewing e-mail.

In FIG. 4A, the two GUI windows used to organize and present information in the e-mail program MS Outlook are shown: the Explorer GUI window 400 and the Inspector GUI window 401. Explorer window 400 is the main GUI for the MS Outlook program, and it gives a user access to each of the folders that make up Outlook: Inbox, Task, Contacts, Calendar, Journals, and Notes folders. The display can be customized on a folder-by-folder basis, such as by specifying which columns are shown in Explorer window 400. Explorer window 400 has several panes: the Outlook bar 491, which in FIG. 4A is showing the Mail folder, on the left-hand side of Explorer window 400; the view pane 493 which in FIG. 4A is showing the list of e-mails in the Inbox on the right-hand top of Explorer window 400; and preview pane 495 which in FIG. 4A is showing the e-mail presently selected in view pane 493 on the right-hand bottom of Explorer window 400. The use and meaning of both Explorer window 400 and Inspector window 401, as well as any panes therein, would be understood by one of ordinary skill in the art.

Inspector window 401 is used to display one item at a time: when a user selects an item in Explorer window 400, a new Inspector window 401 will appear, showing the selected item. In FIG. 4A, the user has double-clicked on an e-mail 411 shown in either the view pane 493 or the preview pane 495 of Explorer window 400, and thus a separate Inspector window 401 appears showing the details of the selected e-mail 411.

In e-mail 410, telephone number 411 is shown underlined in both preview pane 495 of Explorer window 400 and Inspector window 401. Thus, e-mail 410 has been parsed and classified according to steps 110 and 120 in FIG. 1A and the telephone numbers that were detected in step 120 are underlined in FIG. 4A according to step 140 in FIG. 1A. Similar to the second presently preferred embodiment, in the third presently preferred embodiment, when the cursor is placed over a underlined telephone number (e.g., phone number 411), an "i" icon box 420 appears above the underlined telephone number indicating that particular functionality is available for the underlined telephone number. In the Inspector window 401 of FIG. 4A, the user has clicked the "i" icon 420, thereby causing pull-down menu 430 to appear, similar to step 163 in FIG. 1B.

Although the "i" icon 420 is shown immediately above and to the right of underlined telephone number 411 in FIG. 4A, "i" icon 420 may appear at other positions on the computer screen. Furthermore, although when the cursor is located over the span of a underlined telephone number, the 'i' icon 420 of a Smart Tag appears in the second and third presently preferred embodiments, it should be understood that any icon and/or visual representation could be used to indicate the available functionality for the underlined telephone number. For example, the icon could be the image of a telephone. The icon could also be permanently represented, i.e., appear at all times next to the highlighted telephone number, even when the cursor is nowhere near the highlighted telephone number.

The only option presented to the user in pop down menu 430 of FIG. 4A is "Call Number". Other options could appear in pop down menu 430 in other implementations of the third presently preferred embodiment, as would be known to one of ordinary skill in the art, such as, inter alia, the options shown in pop up menu 230 in FIG. 2A and pop down menu 330 in FIG. 3A, or different options, such as reverse telephone number lookup, which would access a reverse phone lookup directory to verify or to obtain the address and name associated with the highlighted telephone number.

Although not shown in FIG. 4A, an IP-phone bookmarklet could appear in other embodiments in the standard toolbar at the top of Explorer window 400 and/or Inspector window 401; this bookmarklet could be used to turn the Email-Dial functionality on or off. When the Email-Dial functionality is turned off, the telephone numbers are not underlined or indicated in any way (i.e., the e-mail appears as it would appear in a standard, prior art e-mail GUI). Furthermore, in some embodiments having a bookmarklet, the user may use the cursor to select a telephone number in an email and then press the bookmarklet button to pass the telephone number to an IP telephony program or to perform other operations upon or with the telephone number, such as store it in an address book. This manual selection capability could also be provided for those cases where the telephone numbers are not identified or underlined on a document page (and thus are not clickable), or when a telephone number has been saved in provisional memory (such as the computer clipboard) and now the user wishes to dial it.

According to any of the presently preferred embodiments, the functionality provided for the highlighted telephone number may vary. For example, one left-click could result in the telephone number being automatically dialed (without any further interaction by the user). As another example, left- and right-clicks may show different pop-down menus for different purposes.

FIG. 4B is a schematic diagram of components performing the functions resulting in the capability and GUI functionality shown in FIG. 4A. In FIG. 4B, an email program, in this case, MS Outlook 450, receives emails in any of Plain, RTF, or HTML format as well as user input or interaction. Email-Dial Add-in 460 is a COM (Component Object Model) Add-in, a DLL, which is registered with MS Outlook 450 so that it is loaded and initialized whenever a new instance of MS Outlook 450 is started. Thus, Email-Dial Add-in 460 loads into MS Outlook 460's address space and can perform any action on the available windows and modules in MS Outlook 460. Email-Dial Add-in 460 is typically unloaded when the instance of MS Outlook 450 is destroyed, although this may not be true in some embodiments.

An "object" in object-oriented programming (and thus in any Object Model, including Outlook Object Model 462) is generally a self-contained entity that consists of both data and procedures to manipulate the data. Thus, almost anything in the programming environment is an object, and an Object Model, such as Outlook Object Model 462, allows one to access and manipulate those objects. In the Outlook Object Model 462, the object MailItem is an instance of an email; the object Inspector is an instance of an Inspector window 401; the object Explorer is an instance of an Explorer window 400; the object objExpMailItem is an email selected by the user and currently being viewed in the preview pane 495 of Explorer window 400; and the object objMailItem is an email selected by the user and currently being viewed in an Inspector window 401.

Event Handler 462 in EmailDial Add-in 460 uses its access to Outlook Object Model 452 in MS Outlook 450 to listen for events that are fired by active objects in MS Outlook 450 at specific times: the SelectionChange event which is fired when an email is being loaded into preview pane 495 of Explorer window 400; the NewInspector event which is fired when the user has selected (i.e., double-clicked) an e-mail in the Explorer window 400, thereby causing an Inspector window 401 to appear; and any event which requires that an email that may have been tagged by the Email-Dial Add-in 460 to be restored to its original format, such as Forward, Reply, Reply-All, Write, etc.

When a SelectionChange or NewInspector event is detected, Parser 464 parses the run-time Outlook Object Model of the email being loaded into either the preview pane 495 of Explorer window 400 or Inspector window 401 using the Outlook Object Model API (much in the same way as the DOM API 252 in FIG. 2B of the first presently preferred embodiment). Specifically, Parser 464 parses the email object being loaded to find any instances of telephone numbers using regular expression parsing rules designed to pick up the various formats that phone numbers can take within a computer document, in a manner similar to the first and second presently preferred embodiments. Although not shown in the embodiment of FIG. 4B, it is also possible to have a module such as Classifier 266 in FIG. 2B for further filtering of potential telephone numbers.

Parser 464 outputs the detected telephone numbers to Markup Module 468, which will highlight and provide the GUI functionality for the detected telephone numbers. However, because the email may be in any format, including Plain text or RTF which do not allow markup tags, any email which is being loaded for viewing must be converted into HTML format (thereby creating a provisional viewing computer document, as in step 170 of FIG. 1C). When this conversion is made, a field is added to the provisional viewing email which indicates the original format of the email (e.g., Plain/RTF/HTML). In this way, the provisional viewing email can be converted back to its original format after viewing has completed, or before an action is performed with or upon the email.

Markup Module 468 creates a tag which is placed around the telephone number in the provisional viewing email (which is maintained in its own namespace), as in step 133 of FIG. 1C. As in the other presently preferred embodiments, the tags indicate that any detected phone number will be highlighted and active upon certain cursor events. Specifically, when the cursor is over an underlined telephone number, the "i" button 420 will appear in the GUI window above the underlined telephone number indicating that functionality is available for this number. If the "i" button is selected, the appropriate menu 430 of options appears. If the "Call Number" option is selected, Event Handler will call and provide the appropriate number string to IPSoftphone 470, which will perform the dialing and connecting.

When any event, such as Forward, Reply, ReplyAll, Write, etc., which requires that the provisional viewing email be restored to its original format, is detected (step 180 in FIG. 1C), the provisional viewing email is stripped of any tagged telephone numbers and then restored to its original format according to the field added to the provisional viewing email HTML document for such a purpose (step 190 in FIG. 1C).

The Email-Dial Add-in 460 ensures that the provisional viewing email HTML document is created as late as possible (before viewing) and undone as early as possible (before an action requiring the originally formatted email is performed). Furthermore, the Email-Dial Add-in 460 works transparently, and, in some embodiments, can be enabled/disabled by the user using a bookmarklet, preference setting, or other means.

Additional Functionality

Thus far, the additional functionality of a tagged telephone number has been described in relation to my prior patent applications referenced above. According to the embodiments disclosed herein, however, the inventive method provides for further functionality for the telephone numbers uncovered by the inventive method, and found in the computer documents searched thereby.

Facsimile Transmissions

For example, if it is determined (e.g., by uncovered context information), that a particular tagged telephone number is a facsimile number, it may be possible for the user to click directly on the tagged telephone number, and send a facsimile transmission to that number. The act of clicking may activate an applet to create a facsimile "cover page", in known fashion, as is common in most word processing programs, and to give the user the ability to append a further document, such as an already generated word-processing document, as part of the facsimile transmission. The cover page may be generated automatically, in whole or in part, and may be based upon the context information, such as where the context information includes the name of the facsimile recipient and/or a proposed subject. In most cases, the user may be given the opportunity to modify the cover page, but, in some cases, such as where the computer document encourages the use of a standardized cover page format, the option to modify may be limited or eliminated.

Messaging

According to another aspect of the invention, the additional functionality may be the ability to transmit a message directly to the telephone number, as where the telephone number is associated with a short message service (SMS), such as a pager, or an instant messaging (IM) account. In these cases, the invoking of the additional functionality allows the user to send a suitable message to the tagged telephone number. The message may be of a particular nature, such as a request to initiate a telephone conversation immediately, or schedule one at a later time. The telephone conversation being offered may also be a conference call, with the other participants identified, or not, at the option of the user.

Additionally, the information sent via SMS or IM may be either input by the user or captured from the document in which the number was found. In the case of an IM message, the tagged telephone number may be sent to a corporate server which returns back the IM address associated with the tagged telephone number, and that IM address is used to initiate an IM session with the clicked telephone number.

Sending Telephone Numbers to Other Devices

A particular benefit of the inventive method is the ability to transmit telephone numbers to devices and applications associated with the user's device and the specific application in which the number was uncovered. For example, if a user finds a telephone number of interest, it may be sent to a separate device, such as a personal digital assistant (PDA), cellular telephone, a laptop or other device having a database of contact or other similar information. The device may be physically disconnected from the device on which the user displayed the GUI in which the telephone number was highlighted. In this case, the telephone number, together with any context information associated therewith, may be sent to the separate device by any suitable means, such as Bluetooth or IrDA transmissions, in known fashion. These separate device may receive the transmission, and store the telephone numbers in known fashion. Alternatively, such as where the separate device is a telephone dialer, the device may act immediately on the telephone number so transmitted.

In situations, where the separate device is physically connected to the user's device, but logically separate therefrom, the telephone number and context information may be sent over a physical, or wired connection. This would be, for example, where the separate device is connected to the user's device over a network (including, possibly, the Internet), or through a cable (such as, for example, in the case of a synchronization cable or USB connection), or even as different parts of the user's computer (such as, for example, different logical drives, different partitions, different folders, different programs or different files). Each of these types of relationships are examples of "logical connections" and the like as used herein. Devices which are not "logically connected" are therefore "logically separate".

It would also be possible, by means of the inventive method, to send tagged telephone numbers and/or context information to more than one separate device, such as through a WAP push. This feature may be useful in sending tagged telephone numbers and context information to a group of cellular telephones which may require the tagged numbers and/or context information. Provided the cellular telephone are registered with a push server, the desired data may be transmitted to the server, and then to a plurality of other devices registered therewith. This may be especially useful in the case of sending updated contact information to a distributed work force, such as for salespersons or repairpersons in the field.

Multiple Tagged Numbers

Many computer documents will contain multiple telephone numbers. For ease of handling these numbers, and a standardized format for presenting them to the user, it may be desired to generate a separate window in the GUI in which all or some of the telephone numbers are displayed, possibly together with any relevant context information uncovered by the method. Then, the user may be given the option of performing the same function with respect to all of the tagged and/or displayed numbers simultaneously, such as saving them all, setting up a conference call with them all or sending a SMS or IM broadcast to all.

It is possible, however, that less than all of the tagged telephone numbers so displayed may actually be of interest to the user. In this case, the user may be given the option of selecting specific ones of the total number of tagged telephone numbers, and deleting them from the display. The user may then act on all desired tagged telephone numbers, and perform the same action upon all of the desired numbers. For example, by choosing relevant numbers from the list, the desired telephone numbers, together with any uncovered (and desired) context information) may be sent to the user's PDA (as described above).

Checking the Status of the Tagged Telephone Number

Once a telephone number is tagged in a computer document, the user may have the option of attempting to establish communication with that number as described previously. It is possible, however, that the party with whom the tagged telephone number is associated may prefer to have communications under certain conditions (such as, between 9 am and 5 pm, Eastern Time, Mondays through Fridays), or by means of a specific preferred means of communications (such as, preferably by IM). It is also possible that the party associated with the tagged telephone number may be perfectly willing to receive the phone call from the user at this moment, but for the fact that that party is already on the telephone.

In such instances, it would be useful if the user were told the status of the tagged telephone number. For example, the number could be checked to ensure it is still in service, has a forwarding number associated therewith, or is busy or malfunctioning. Once this status is determined, the user may be informed of the status of the line.

Alternatively, the context information could be checked to determine if the telephone number has any preferences associated therewith, such as the time or day to be called, or any preferred mode of communication (possibly listed in a hierarchical list of preferences). All of this information may be presented to the user for informing the user's decision on how to best utilize the information gathered from the tagging of the telephone number and the uncovering of the context information.

Creation of Additional Context Information

As explained in my prior filed application Ser. No. 11/224,160, referenced above, context information is often useful for any tagged telephone number. That information may be found in the computer document itself, or generated or edited by the user into a form the user finds most helpful. In some contexts, the context information may even be generated during a communication session initiated with the tagged telephone number. For example, the user may find a tagged telephone number, and immediately initiate a telephone conversation with the party at the tagged telephone number. During the conversation, the user may wish to take notes, or record all or part of the conversation (by audio alone or in connection with a video call). This information may be useful as context information. According to the method, a user may be given the option of opening an application in which the tagged telephone number was not found, such as a video capture, audio capture, or word-processing program, and generate context information while connected the tagged telephone number. This context information may be saved and made part of the context information associated with the tagged telephone number. Alternatively, the context information could be in the form of digital information from another source, such as a saved photograph or sketch generated by some third party and sent to the user by e-mail. All of these uses permit the saving of context information generated before, during or after the communication session with the tagged telephone number.

Using Tagged Telephone Numbers and/or Context Information to Add Functionality to Other Applications According to a further aspect of the invention, a tagged telephone number may add functionality to applications other than the one in which it was found.

For example, one common use of the invention is expected to be in the context of browsing web pages through a web browser, such as Internet Explorer (IE). In this application, when a telephone number is uncovered, it is tagged and highlighted in IE, and the user is therefore alerted to the possibility that there is a telephone number of interest, and then given the opportunity to send that telephone number and/or context information to another application, such as a contact manager. This is described in my prior pending applications.

This information may be of even further benefit, however, if the information is placed on the toolbar of the other application and provided even further functionality. For example, if the user uncovers a web page having a possible new tagged telephone number, the user may wish to know if the telephone number is already in the contact manager, and, if so, whether the context information already present in the contact manager contains all of the context information found in the current web page. This may be accomplished by adding a button to the toolbar of the contact manager, and enabling the contact manager to receive the telephone number and/or context information directly from IE. The contact manager could then be enabled to search for the information sent to the toolbar, for example, to find other listings of persons from the same company, or other sources for spare parts, or any other information that may provide a desired context for the user in a particular application.

It would also be useful, in this environment, to permit the user to look to see if there has been any prior contact with the telephone number, and review the context information, including any notes or comments with respect thereto. This may be or particular utility where the database in which this information is stored is accessible to more than one user, and so not every user may know of any such prior contacts.

All of the implementation details and available options have not been described in detail with reference to any particular embodiment, as they may be gleaned from the descriptions in the '468 application and the descriptions of the other presently preferred embodiments described herein.

While there have shown and described and pointed out fundamental novel features of the invention as applied to a preferred embodiment thereof, it will be understood that various omissions and substitutions and changes in the form and details of the method steps described, the devices illustrated, and the operation thereof, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for automatically detecting instances of telephone numbers in a computer document and for providing functionality for any detected instances of telephone numbers in the computer document, comprising the steps of:
   when opening a computer document in an application such that the computer document will be rendered in a graphical user interface (GUI) window:
      creating a provisional markup language document for visually rendering the computer document in the GUI window;
      automatically parsing the computer document and/or the provisional markup language document for any instance of a telephone number; and
      placing tags around any detected instance of a telephone number in the provisional markup language document;
   visually rendering the provisional markup language document in the GUI window such that any tagged telephone number provides primary visual indicia that (i) it is a telephone number, and (ii) functionality is available for the telephone number;
   providing functionality for a user to select any tagged telephone number to perform or initiate one or more desired operations either with or upon the selected tagged telephone number, wherein said functionality is not native to the computer document; and
   identifying context information surrounding any tagged telephone number and displaying said context information in conjunction with its respective telephone number, the context information including at least an identity associated with the context information and being identified based on one of a proximity of the context information to the respective telephone number in a hierarchical tree and a hierarchical relationship of the context information to the telephone number;
   wherein the functionality comprise:
      sending a facsimile transmission to the tagged telephone number;
      sending a message to the tagged telephone number; and
      sending the tagged telephone number to a device distinct from the device used by the user to parse the computer document.

2. The method of claim 1, wherein the selected functionality is sending a message to the tagged telephone number.

3. The method of claim 2, wherein the message is a short message service (SMS) message.

4. The method of claim 2, wherein the message is an instant message (IM).

5. The method of claim 4, wherein the IM is sent to a corporate server, which returns an address to the user to initiate an IM session with the tagged telephone number.

6. The method of claim 2, wherein the message is input by the user.

7. The method of claim 2, wherein the message contains information captured from the computer document in which the tagged telephone number is found.

8. The method of claim 2, wherein the message is a request to schedule a communication session.

9. The method of claim 2, wherein the communication session is a telephone call with the tagged telephone number.

10. The method of claim 9, wherein the telephone call is a conference call involving at least the tagged telephone number.

11. The method of claim 1, wherein the selected functionality is sending the tagged telephone number to said distinct device from said device used by said user.

12. The method of claim 11, wherein said distinct device is physically separate from said device used by said user.

13. The method of claim 12, wherein said distinct device is a cellular telephone.

14. The method of claim 12, wherein said distinct device is a personal digital assistant (PDA).

15. The method of claim 12, wherein said tagged telephone number is sent by means of a wireless transmission.

16. The method of claim 15, wherein said tagged telephone number is sent by means of an infrared data (IrDA) transmission.

17. The method of claim 15, wherein said tagged telephone number is sent by means of a Bluetooth transmission.

18. The method of claim 15, wherein said distinct device comprises more than one separate distinct device.

19. The method of claim 18, wherein said tagged telephone number is sent by means of a WAP push.

20. The method of claim 1, wherein there is more than one tagged telephone number in the computer document.

21. The method of claim 20, further comprising the step of opening a window in which said more than one tagged telephone number is displayed.

22. The method of claim 21, further comprising the step of permitting the user to perform one or more actions on at least one tagged telephone number in the window.

23. The method of claim 22, wherein one of said actions is saving said at least one tagged telephone number.

24. The method of claim 22, wherein one of said actions is establishing a conference call with said at least one tagged telephone number.

25. The method of claim 22, wherein one of said actions is broadcasting a message to said at least one tagged telephone number.

26. The method of claim 1, further comprising the step of checking the status of the tagged telephone number.

27. The method of claim 26, wherein said status includes a preferred mode of communication with said tagged telephone number.

28. The method of claim 27, wherein said functionality further comprises giving the user the option of communicating with said tagged telephone number by said preferred mode of communication.

29. The method of claim 1, further comprising the step of opening another application while in communication with said tagged telephone number to permit the creation of context information which may be associated with said tagged telephone number.

30. The method of claim 29, wherein said context information is text information.

31. The method of claim 29, wherein said context information is video data.

32. The method of claim 29, wherein said video data is video-captured during a video communication session with said tagged telephone number.

33. The method of claim 29, wherein said context information is audio data.

34. The method of claim 33, wherein said audio data is recorded during a communication session with said tagged telephone number.

35. The method of claim 29, wherein said context information includes digital information generated independently of the communication session.

36. The method of claim 29, further comprising the step of associating data stored through said application with said telephone number.

37. The method of claim 29, wherein said step of associating data includes associating said saved data with said tagged telephone number automatically when saved in said opened application during a communication session initiated through the method.

38. The method of claim 29, further comprising the step of permitting the user to save data at a later date and associate such saved data with said tagged telephone number as context information for use at a later time.

39. The method of claim 29, further comprising the step of permitting the user to associate pre-existing context information with a tagged telephone number.

40. The method of claim 29, further comprising the step of permitting the user to associate later-generated context information with a tagged telephone number.

41. The method of claim 1, further comprising the step of checking a database associated with the tagged telephone number for context information.

42. The method of claim 41, further comprising the step of permitting the user to retrieve said context information from said database, and associating said context information with said tagged telephone number.

43. The method of claim 1, wherein the selected functionality is adding the tagged telephone number to a toolbar of an application other than one in which the step of parsing is performed.

44. The method of claim 43, wherein said other application includes at least one of the following options:
   permitting the user to search for telephone numbers in a database;
   permitting the user to search for specified context information in said database;
   automatically searching said database for said tagged telephone number; and
   automatically searching for specified context information in said database.

45. The method of claim 44, wherein said other application includes automatically searching for said specified context information in said database and said method further comprises the step of displaying any telephone number associated with an instance of said specified context information in said database.

46. The method of claim 1, wherein the selected functionality is sending a facsimile transmission to the tagged telephone number.

\* \* \* \* \*